US012488651B2

(12) United States Patent
Urban et al.

(10) Patent No.: US 12,488,651 B2
(45) **Date of Patent: *Dec. 2, 2025**

(54) GAMING CABINET WITH CURVED DISPLAYS, INTEGRATED CANDLE LIGHTING, AND THREE-DIMENSIONAL EFFECT LIGHTING

(71) Applicant: Aristocrat Technologies, Inc. (ATI), Las Vegas, NV (US)

(72) Inventors: Bruce Urban, Las Vegas, NV (US); Garrett Hill, Las Vegas, NV (US); Samuel Villanueva, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/658,394

(22) Filed: May 8, 2024

(65) Prior Publication Data

US 2024/0290163 A1 Aug. 29, 2024

Related U.S. Application Data

(63) Continuation of application No. 17/980,675, filed on Nov. 4, 2022, now Pat. No. 12,014,593, which is a continuation of application No. 17/315,648, filed on May 10, 2021, now Pat. No. 11,532,199, which is a continuation-in-part of application No. 16/915,495, filed on Jun. 29, 2020, now Pat. No. 11,151,834.

(60) Provisional application No. 62/875,497, filed on Jul. 17, 2019.

(51) Int. Cl.
*G07F 17/32* (2006.01)

(52) U.S. Cl.
CPC ................................ *G07F 17/3211* (2013.01)

(58) Field of Classification Search
CPC .................................................. G07F 17/3211
See application file for complete search history.

(56) References Cited

U.S. PATENT DOCUMENTS

| | | | |
|---|---|---|---|
| 6,217,448 | B1 | 4/2001 | Olsen |
| D489,144 | S | 4/2004 | Dalton |
| D499,145 | S | 11/2004 | Yao |
| D508,961 | S | 8/2005 | Gatto |
| D519,568 | S | 4/2006 | Yao |
| D529,966 | S | 10/2006 | Lesourd |

(Continued)

OTHER PUBLICATIONS

Office Action dated Jun. 23, 2021 for U.S. Appl. No. 16/915,495 (pp. 1-9).

(Continued)

*Primary Examiner* — Werner G Garner
(74) *Attorney, Agent, or Firm* — Weaver Austin Villeneuve & Sampson LLP

(57) ABSTRACT

Disclosed are gaming systems, methods and machines for a gaming cabinet configuration. In particular, the gaming systems, methods and machines may incorporate gaming cabinets that include one or more curved or arcuate screens, one or more candles integrated into one or more lighting features arranged on one or more edges of the gaming cabinet, the one or more candles and the one or more lighting features connected to a game controller via one or more interfaces, and/or one or more diffuse lighting elements to provide lighting features or effects.

20 Claims, 19 Drawing Sheets

(56) References Cited

U.S. PATENT DOCUMENTS

| | | | |
|---|---|---|---|
| D536,389 S | 2/2007 | Lesourd | |
| D536,742 S | 2/2007 | Kaminkow | |
| 7,442,125 B2 | 10/2008 | Paulsen | |
| D644,189 S | 8/2011 | Lin | |
| D646,337 S | 10/2011 | Kelly | |
| D679,439 S | 4/2013 | Lai | |
| 8,430,756 B2 | 4/2013 | Mccomb | |
| D685,033 S | 6/2013 | Wudtke | |
| D706,741 S | 6/2014 | Myers | |
| 8,777,757 B2 | 7/2014 | Chudek | |
| D715,364 S | 10/2014 | Wudtke | |
| D719,615 S | 12/2014 | Inoue | |
| D742,975 S | 11/2015 | Myers | |
| D759,940 S | 6/2016 | Hori | |
| RE46,169 E | 10/2016 | Kelly | |
| D780,494 S | 3/2017 | Husseini | |
| D801,739 S | 11/2017 | Husseini | |
| D820,915 S | 6/2018 | Lee | |
| D830,725 S | 10/2018 | Scribner | |
| D832,356 S | 10/2018 | Castro | |
| D833,534 S | 11/2018 | Lee | |
| 10,127,761 B2 | 11/2018 | Woels | |
| D842,933 S | 3/2019 | Castro | |
| D843,467 S | 3/2019 | Johnson | |
| D843,474 S | 3/2019 | Lesley | |
| D843,475 S | 3/2019 | Lesley | |
| D843,476 S | 3/2019 | Lesley | |
| D846,649 S | 4/2019 | Schoonmaker | |
| D850,536 S | 6/2019 | Stair | |
| D866,667 S | 11/2019 | Stair | |
| D872,190 S | 1/2020 | Zedell, Jr. | |
| D880,606 S | 4/2020 | Glenn, II | |
| D882,696 S | 4/2020 | Lesley | |
| D882,697 S | 4/2020 | Lesley | |
| D882,698 S | 4/2020 | Lesley | |
| D888,158 S | 6/2020 | Glenn, II | |
| D888,834 S | 6/2020 | Lee | |
| D890,264 S | 7/2020 | Johnson | |
| D890,265 S | 7/2020 | Johnson | |
| D890,850 S | 7/2020 | Johnson | |
| D890,851 S | 7/2020 | Johnson | |
| 10,720,007 B2 | 7/2020 | Hawkins | |
| D893,630 S | 8/2020 | Urban | |
| D893,631 S | 8/2020 | Glinka | |
| 10,733,849 B2 | 8/2020 | Marsh | |
| D895,019 S | 9/2020 | Lesley | |
| 10,810,840 B2 | 10/2020 | Casey | |
| D904,522 S | 12/2020 | Kim | |
| D905,172 S | 12/2020 | Zedell, Jr. | |
| D906,433 S | 12/2020 | Demarco | |
| 10,854,038 B2 | 12/2020 | Lewis | |
| 10,861,286 B2 | 12/2020 | Marsh | |
| D907,123 S | 1/2021 | Demarco | |
| D907,125 S | 1/2021 | Demarco | |
| D909,479 S | 2/2021 | Demarco | |
| D913,378 S | 3/2021 | Glenn, II | |
| D923,102 S | 6/2021 | Mcgahn | |
| D926,889 S | 8/2021 | Bruzzese | |
| D934,347 S | 10/2021 | Ocampo | |
| D939,025 S | 12/2021 | Bruzzese | |
| 11,288,916 B2 | 3/2022 | Coon | |
| D954,844 S | 6/2022 | Rosander | |
| D954,845 S | 6/2022 | Johnson | |
| D968,513 S | 11/2022 | Urban | |
| D973,777 S | 12/2022 | Schoonmaker | |
| D973,778 S | 12/2022 | Schoonmaker | |
| D974,472 S | 1/2023 | Colvin | |
| D974,477 S | 1/2023 | Schoonmaker | |
| D976,329 S | 1/2023 | Schoonmaker | |
| 2005/0261057 A1 | 11/2005 | Bleich | |
| 2007/0149291 A1 | 6/2007 | Mitchell | |
| 2008/0113716 A1 | 5/2008 | Beadell | |
| 2008/0113796 A1 | 5/2008 | Beadell | |
| 2009/0069069 A1 | 3/2009 | Crowder, Jr. | |
| 2011/0118034 A1 | 5/2011 | Jaffe | |
| 2011/0195787 A1 | 8/2011 | Wells | |
| 2012/0004030 A1 | 1/2012 | Kelly | |
| 2014/0031119 A1 | 1/2014 | Wells | |
| 2014/0378221 A1 | 12/2014 | Bernard | |
| 2019/0096166 A1 | 3/2019 | Shimizu | |
| 2019/0096174 A1* | 3/2019 | Ambrecht | G07F 17/3223 |
| 2019/0264880 A1 | 8/2019 | Wang | |
| 2019/0321722 A1 | 10/2019 | Hennessy | |
| 2020/0111289 A1 | 4/2020 | Ozaki | |
| 2021/0112645 A1 | 4/2021 | Knipp | |
| 2021/0192889 A1* | 6/2021 | Banas | G07F 17/3211 |
| 2022/0180695 A1 | 6/2022 | Fritz | |

OTHER PUBLICATIONS

Office Action (Notice of Allowance and Fees Due (PTOL-85)) dated Aug. 12, 2021 for U.S. Appl. No. 16/915,495 (pp. 1-9).

Office Action (Non-Final Rejection) dated Feb. 25, 2022 for U.S. Appl. No. 17/315,648 (pp. 1-8).

Office Action (Notice of Allowance and Fees Due (PTOL-85)) dated Jul. 18, 2022 for U.S. Appl. No. 17/315,648 (pp. 1-8).

Tapeguard LED Tape Light Cover, Jul. 10, 2017, diode LED, captured on Aug. 17, 2022, available at <<https://web.archive.org/web/ 20170710011332/https://www.diodeled.com/tapeguard-led-cover.html>: (Year: 2017).

Office Action (Non-Final Rejection) dated Aug. 22, 2022 for U.S. Appl. No. 17/497,081 (pp. 1-11).

Office Action (Notice of Allowance and Fees Due (PTOL-85)) dated Nov. 16, 2022 for U.S. Appl. No. 17/315,648 (pp. 1-5).

Office Action dated May 9, 2023 for U.S. Appl. No. 17/980,675 (pp. 1-24).

Office Action (Final Rejection) dated Feb. 24, 2023 for U.S. Appl. No. 17/497,081 (pp. 1-10).

Notice of Allowance dated Mar. 31, 2023 for U.S. Appl. No. 29/698,015 (pp. 1-7).

Notice of Allowance dated Mar. 31, 2023 for U.S. Appl. No. 29/698,516 (pp. 1-7).

Notice of Allowance dated Apr. 4, 2023 for U.S. Appl. No. 29/698,554 (pp. 1-7).

Office Action (Notice of Allowance and Fees Due (PTOL-85)) dated Jul. 11, 2023 for U.S. Appl. No. 17/497,081 (pp. 1-8).

Office Action (Final Rejection) dated Nov. 14, 2023 for U.S. Appl. No. 17/980,675 (pp. 1-27).

Office Action (Notice of Allowance and Fees Due (PTOL-85)) dated Feb. 21, 2024 for U.S. Appl. No. 17/980,675 (pp. 1-8).

* cited by examiner

GAMING CABINET WITH CURVED DISPLAYS, INTEGRATED CANDLE LIGHTING, AND THREE-DIMENSIONAL EFFECT LIGHTING

RELATED APPLICATION(S)

The present application is a continuation of U.S. Non-Provisional patent application Ser. No. 17/980,675, filed Nov. 4, 2022, and entitled "GAMING CABINET WITH CURVED DISPLAYS, INTEGRATED CANDLE LIGHTING, AND THREE-DIMENSIONAL EFFECT LIGHTING," which is a continuation of U.S. Non-Provisional patent application Ser. No. 17/315,648, filed May 10, 2021, and entitled "GAMING CABINET WITH CURVED DISPLAYS, INTEGRATED CANDLE LIGHTING, AND THREE-DIMENSIONAL EFFECT LIGHTING", which is a continuation-in-part of U.S. Non-Provisional patent application Ser. No. 16/915,495, filed Jun. 29, 2020, and entitled "GAMING CABINET WITH CURVED DISPLAYS, INTEGRATED CANDLE LIGHTING, AND THREE-DIMENSIONAL EFFECT LIGHTING" and claims priority to U.S. Provisional Patent Application No. 62/875,497, filed Jul. 17, 2019, and entitled "GAMING CABINET WITH CURVED DISPLAYS, INTEGRATED CANDLE LIGHTING, AND THREE-DIMENSIONAL EFFECT LIGHTING", all of which are hereby incorporated by reference in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

This disclosure relates generally to gaming systems, methods and machines. In particular, the gaming systems, methods and machines may incorporate gaming cabinets that include one or more curved or arcuate screens; one or more candles integrated into the gaming cabinet; and/or one or more diffuse lighting elements to provide lighting features or effects.

DETAILED DESCRIPTION

Figure 1:
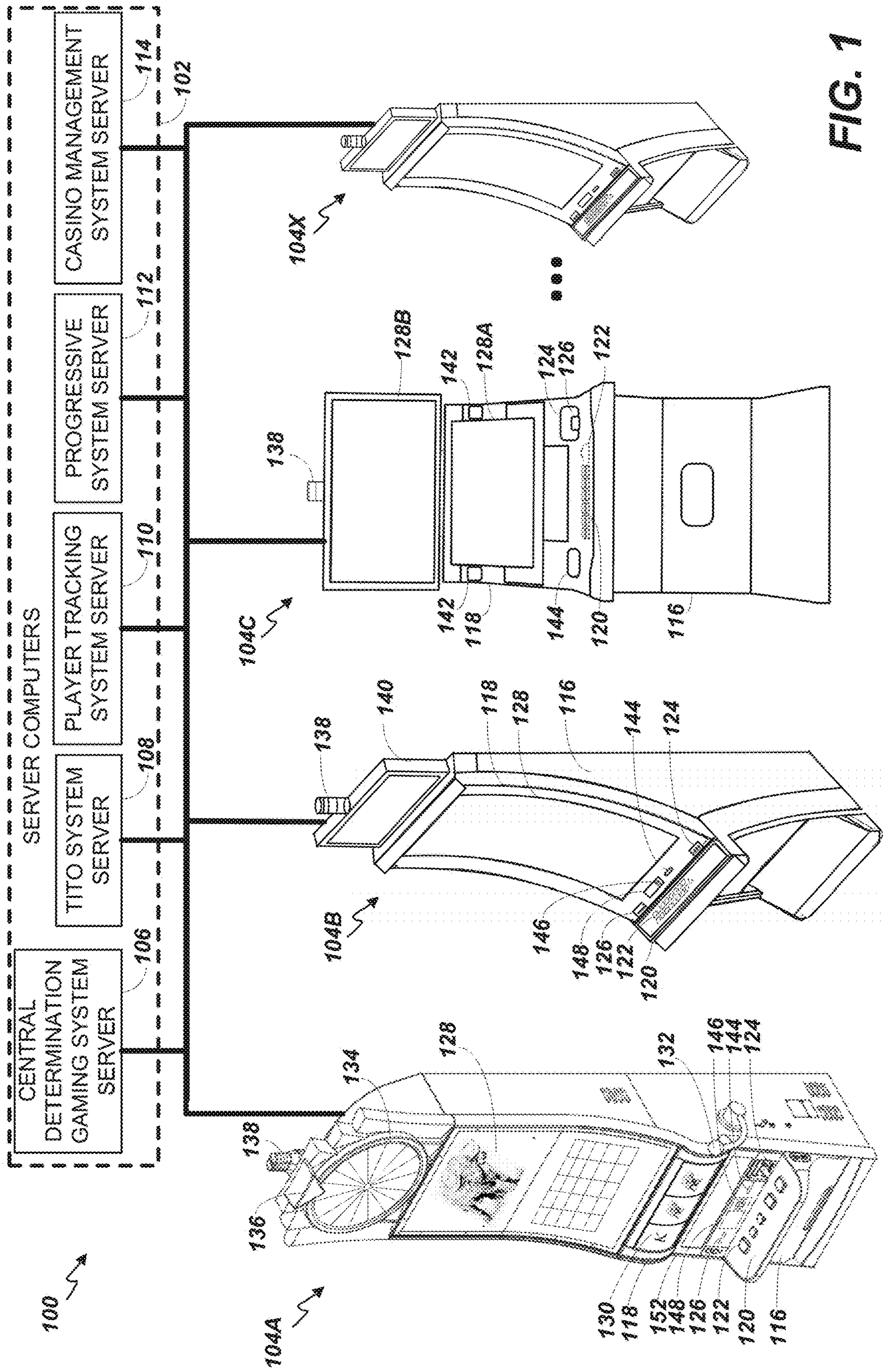
FIG. 1 is an exemplary diagram showing several EGMs networked with various gaming related servers.

Disclosed are systems and methods for a gaming cabinet. In particular, the gaming cabinet may include one or more curved screens; one or more candles integrated into the gaming cabinet; and/or one or more lighting features incorporated within the cabinet.

In a disclosed example, a gaming cabinet includes one or more curved display screens and a single virtual button deck assembly (VBD). The VBD and the one or more curved display screens may be separate screens rather than a continuous piece display (e.g., created with a single piece of glass).

The design of the curved display screen, incorporated with VBD, provides a uniquely angled display in which any "bubble," common in other units, is eliminated when two curved displays are brought together. The curvature of the disclosed display screens defined by a spline function according to a curve or range of curves. Using a spline curve function and interpolation methods serves to create a smooth curvature for the display screen. That is, the spline function provides for a seamless and enhanced viewing experience. The VBD and curved displays provide for optimal viewing angle during game play.

In a disclosed example, candle lighting is integrated in a lighting system for an electronic gaming machine. One objective of integrating the candle light is to maintain the functional purpose of the candle light (e.g., providing information, alerts, responding to elements of gameplay, etc.) without adding an additional element on top (e.g., a physical extension to house the candle light).

For example, provision of a physical extension has the effect of adding additional height to a gaming cabinet. Placement of the candle light within a lighting system of the gaming cabinet also provides unobstructed view of the candle light on taller cabinets (see, e.g., FIGS. 4-6). It may also allow for varied display and other features to be added to the gaming cabinet in place of the conventional candle.

In contrast to conventional candle lighting options, the disclosed integrated candle light integrates into the housing, which enables lighting stages that may signal certain events to casino personnel, reducing the need for a separate lighting assembly or structure to be mounted on top of the gaming cabinet. The integrated candle may include multiple sections (e.g., 2, 3, 4 or more sections) that may provide visual signals via different shade patterns for each section. The colors per section may change per casino/jurisdiction.

In some disclosed examples, lighting effects are created by employing lighting systems that include three-dimensional lighting diffusers. Such diffusers may be arranged along the edges of a display screen, play surface, and/or the gaming cabinet, such as light piping. The use of three-dimensional diffusers creates lighting effects with depth, emitting light from multiple surfaces. In some examples, the lighting effects can include dynamic lighting (e.g., changes in intensity, color, speed, selective illumination, etc.). One or more such effects may be activated in response to gameplay, such as a large wager and/or award of a significant payout. Such lighting effects may pique the interest of players, observes, and crowds as they move relative to and/or interact with the gaming cabinet. Thus, the disclosed lighting system provides a more immersive experience for the player and observer.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
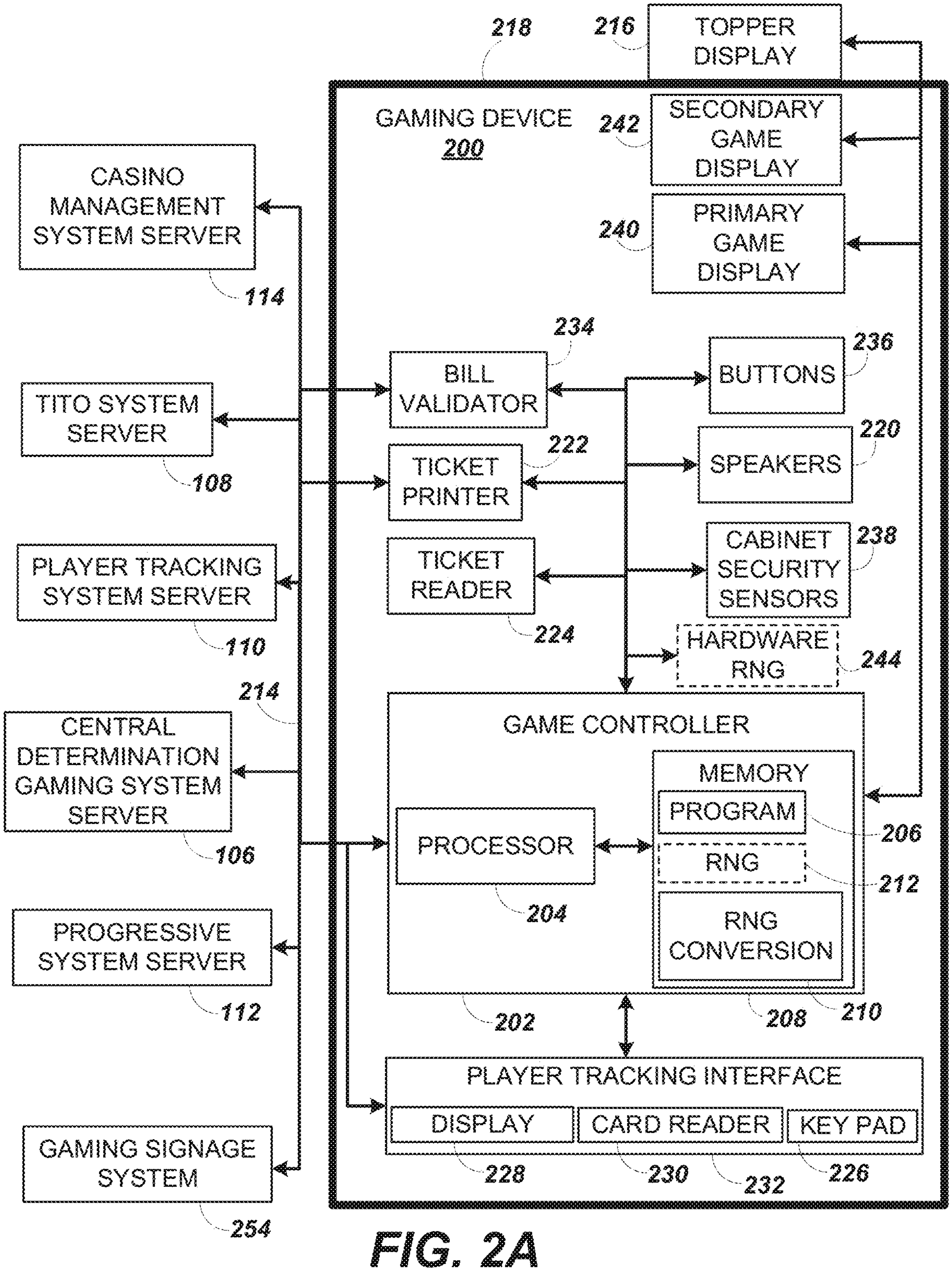
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
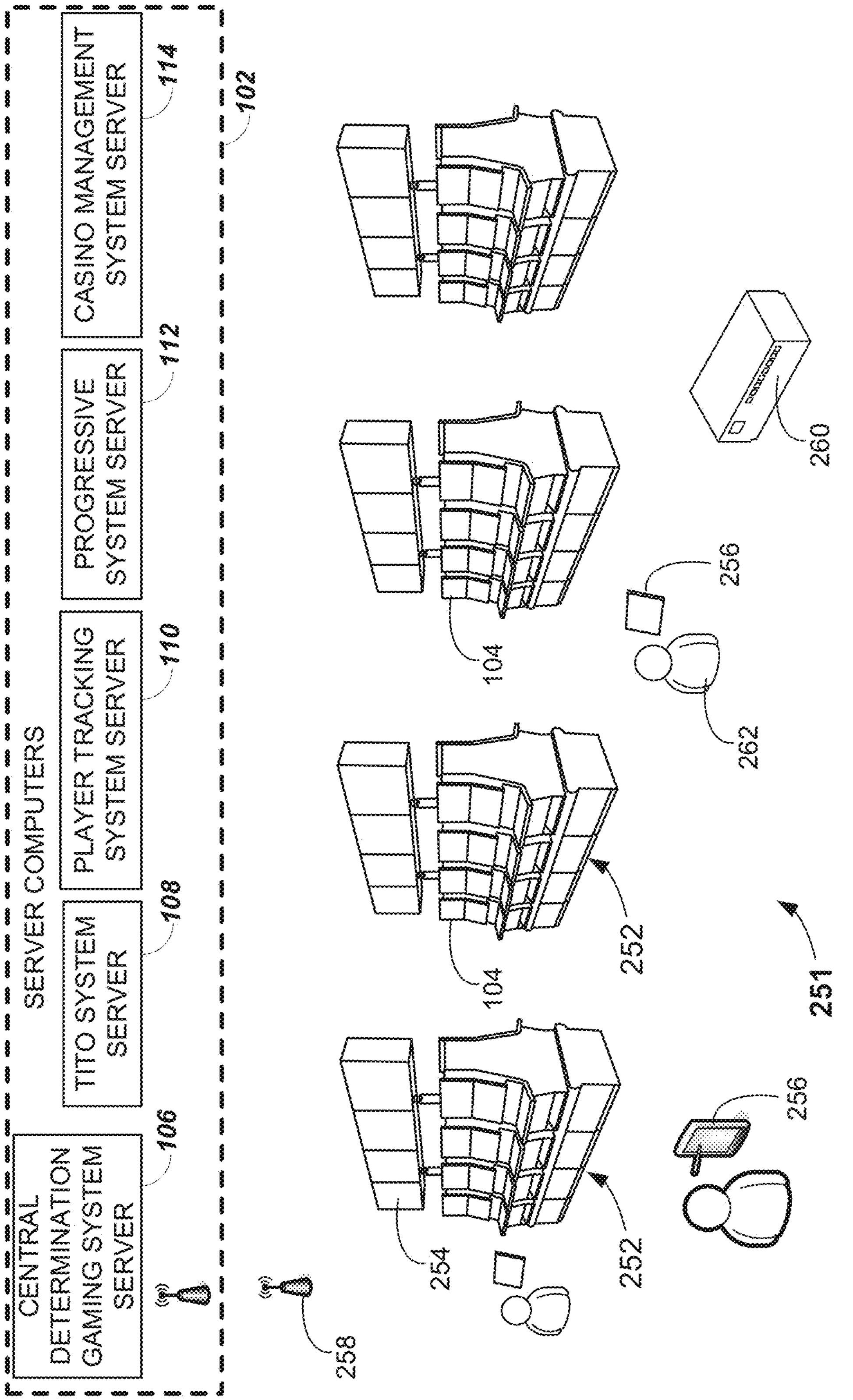
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
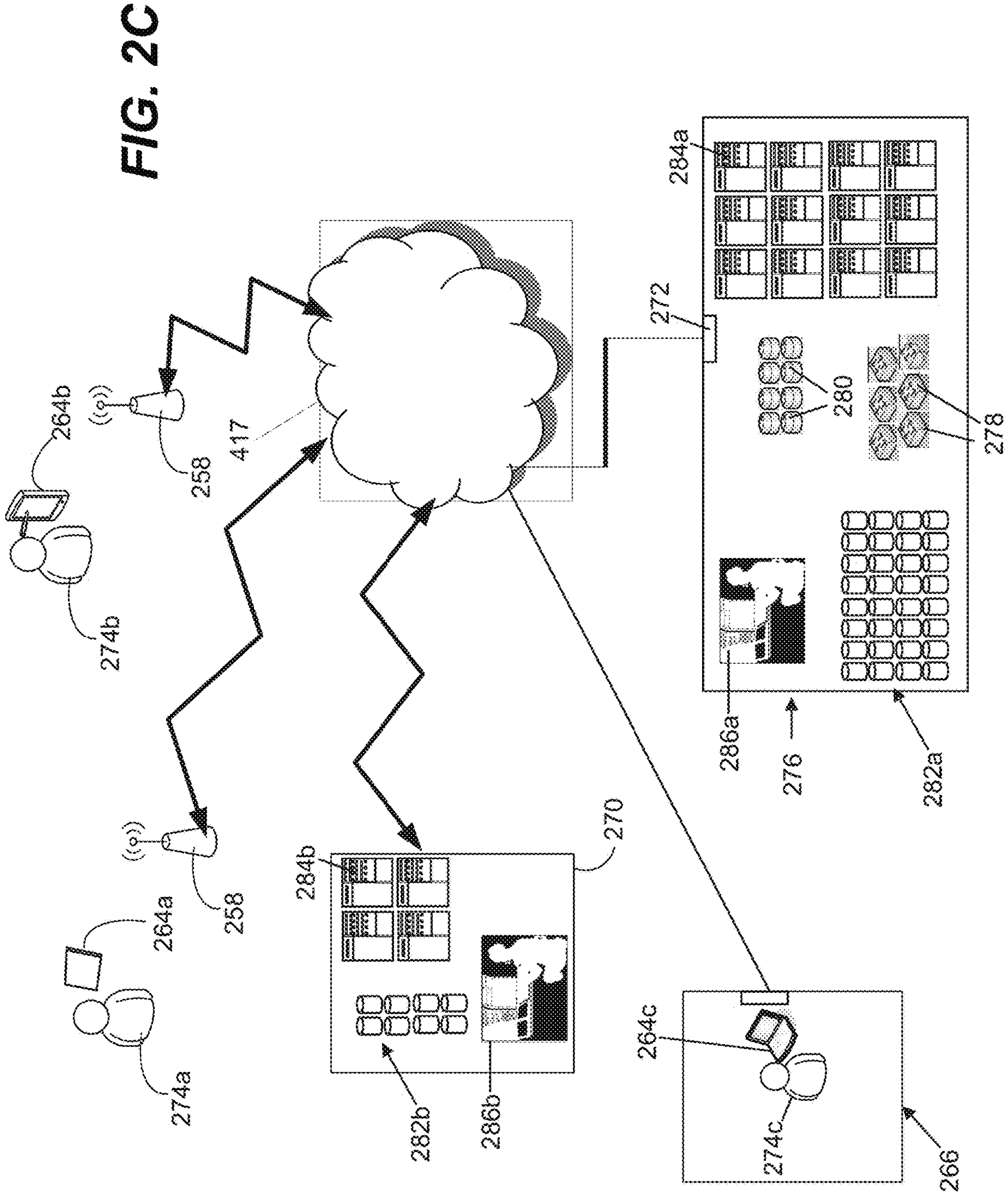
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
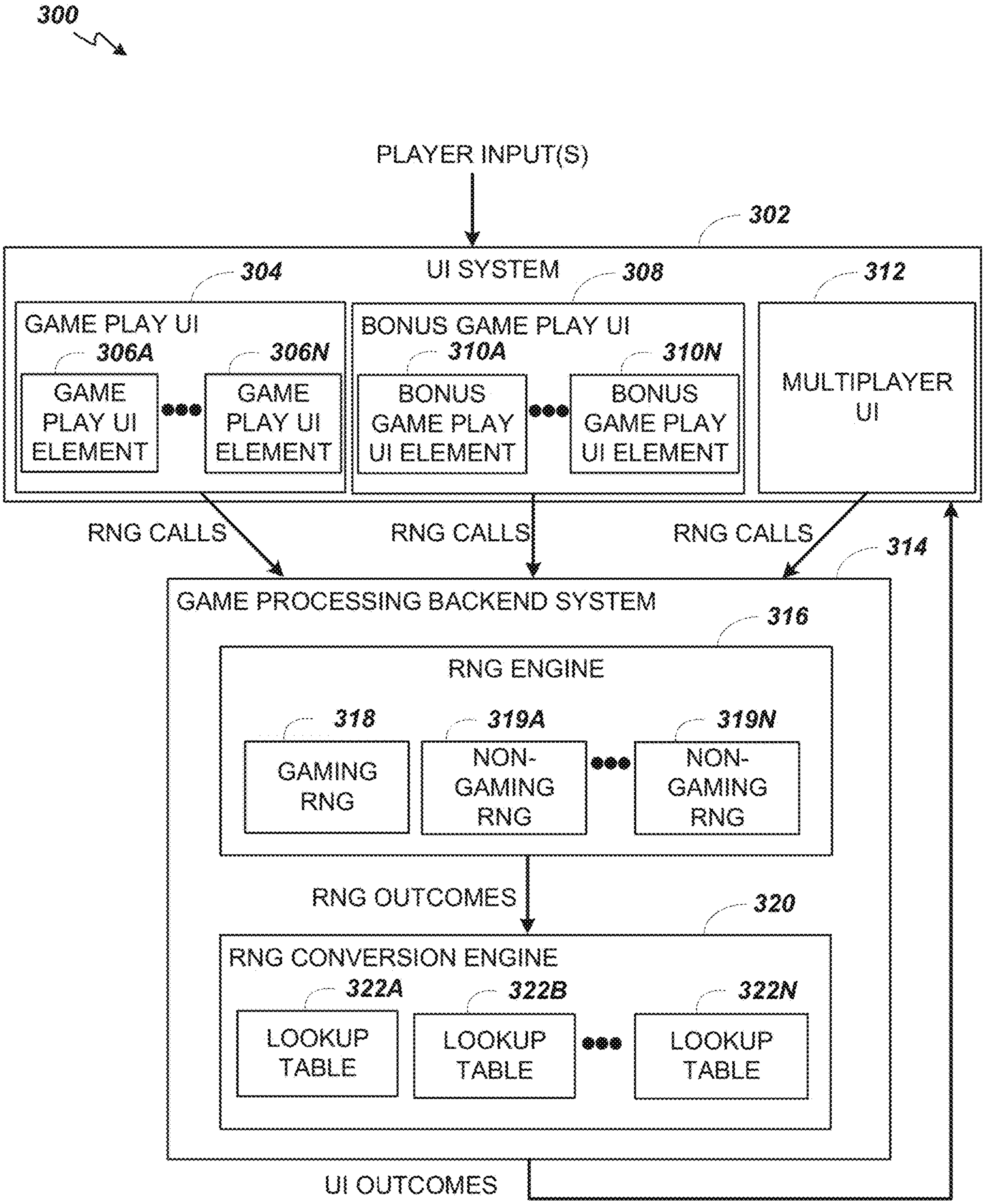
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
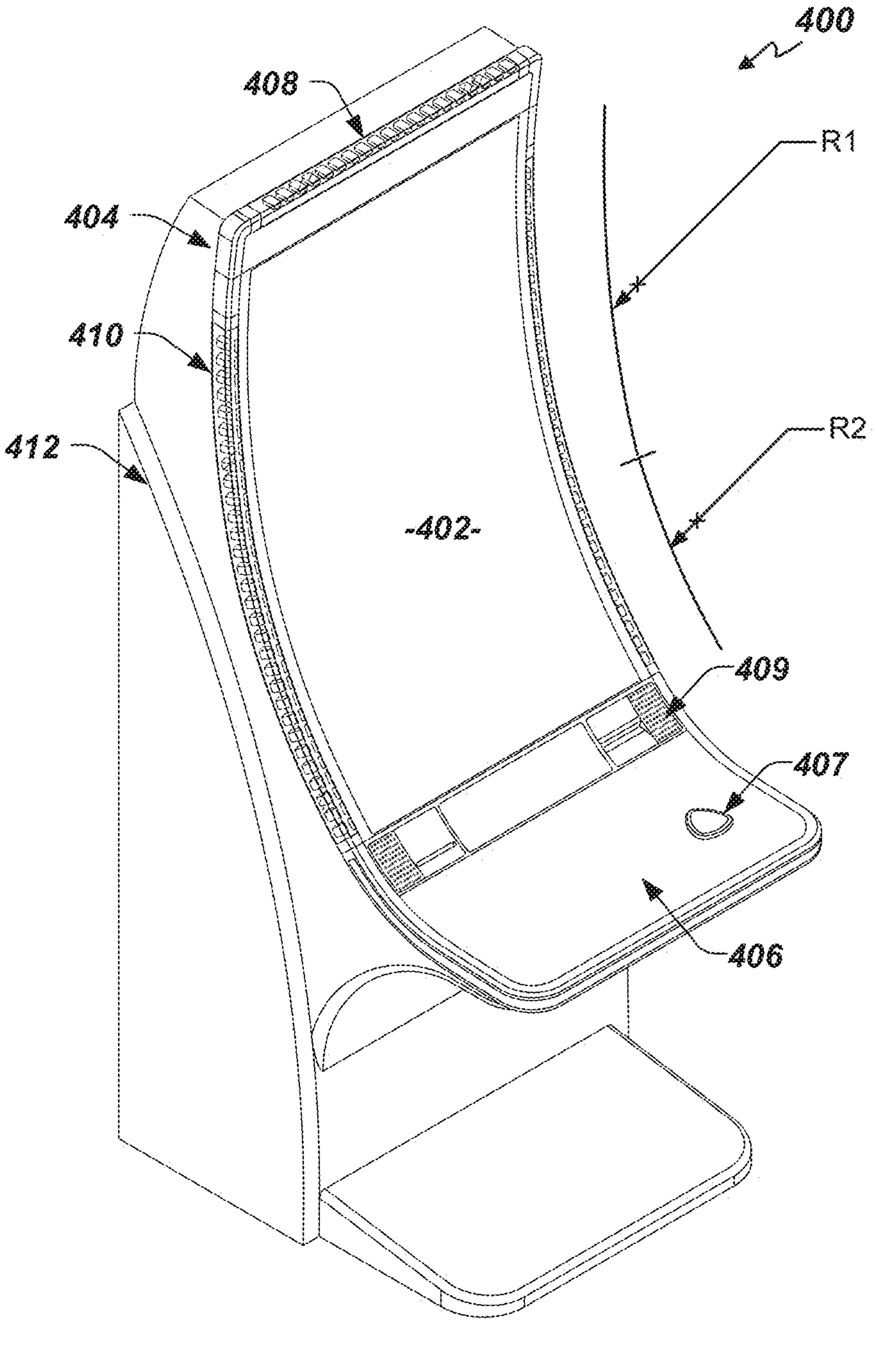
FIG. 4 illustrates an example gaming cabinet according to some aspects of the present disclosure.

FIG. 4 illustrates an example gaming cabinet 400. As shown in FIG. 4, the gaming cabinet 400 includes one or more arcuate or curved display screens 402 and/or input screens 406. Thus, in the example of FIG. 4, a single curved display screen 402 (e.g., 49" 4K display) is provided with another screen 406 (e.g., a user input device, such as a 27" virtual button deck or VBD).

The VBD 406 and curved display screen 402 may be separate screens rather than a continuous piece display (e.g. created with a single piece of glass). The two screens can therefore meet at a transition area 409 into a player tracking area on VBD 406, which may include a floating bash button for use in the gaming cabinet 400. One or more lighting effects may also be included, such as peripheral lighting elements, trim lighting, candles, for instance. In some examples, the transition area 409 includes a console with one or more of an inductive charging pad (e.g., for small electronic devices, such as smart phones) incorporated into the glass, a card acceptor, and/or a separate USB charger port. By way of another example, the VBD 406 may be a touchscreen panel, which may comprise a TFT (Thin Film Transistor) screen and a physical bash button 407 that may be used as a play/select button.

The design of the curved display screen 402, incorporated with VBD 406, provides a uniquely angled display in which any "bubble," common in other units, is eliminated when two curved displays are brought together. The curvature of the disclosed display screen 402 (e.g., a 49" curved display) is uniquely different from other displays, e.g., Aristocrat's ARC EGM. For example, the curve for the disclosed display screens are defined by a spline function according to a curve or range of curves. Using a spline curve function and interpolation methods serves to create a smooth curvature for the display screen. That is, the spline function provides for a seamless and enhanced viewing experience. The VBD 406 and curved display screen(s) 402 provide for optimal viewing angle during game play.

In some examples, the curved display screen 402 may have a curvature defined by a first spline function, with two or more arcuate portions having two or more radii of curvature R1 and R2. The VBD 406 may have a curvature defined by a second spline function, which may also include two or more radii of curvature. The combined screen that includes both curved display screen 402 and VBD 406 may include a third spline function.

One or more candles 404 is shown integrated with the gaming cabinet 400, arranged at a height that allows high visibility while the gaming cabinet 400 is located on a gaming floor. The candle 404 may be integrated within an edge of the gaming cabinet 400, such as a lateral trim surrounding the display screens, which may further include an upper lighting feature 408 and/or a lateral lighting feature 410. In some examples, one or more lighting effects are visible, such as a side lighting feature 412.

Figure 5A:
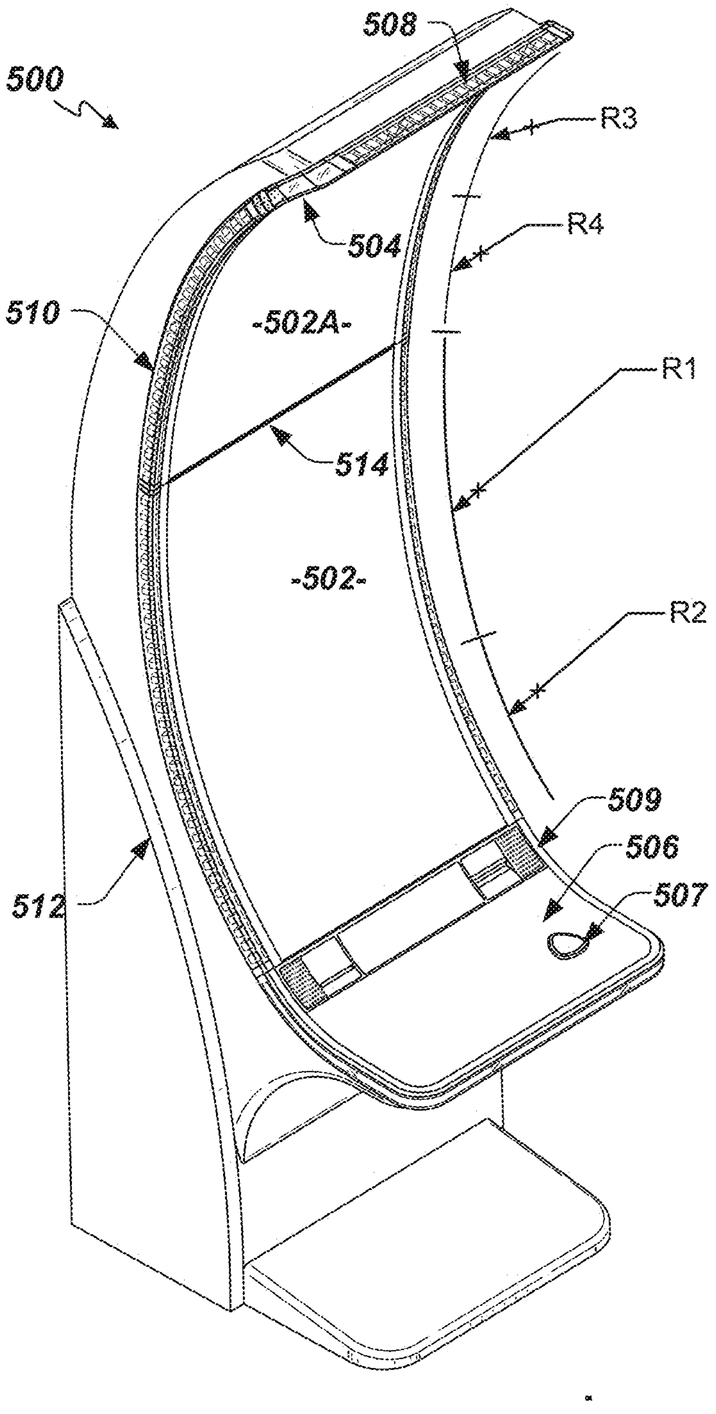
FIGS. 5A to 5C illustrates another example gaming cabinet according to some aspects of the present disclosure.

FIG. 5A illustrates a gaming cabinet 500, which includes dual curved display screens 502, 502A (e.g., 49" 4K display) with a single VBD 506. The curved display screen 502A may have a curvature defined by another spline function (e.g., a third spline function), with two or more arcuate portions having two or more radii of curvature R3 and R4, in addition to the radii of curvature R1 and R2 for the curved display screen 502 (similar to curved display screen 402 of FIG. 4). As shown, the dual curved display screens 502, 502A are separated at an interface 514, which may or may not be visible to a player. In addition to or in the alternative of spline functions corresponding to each curved display screen 502, 502A and VBD 506, a single spline function may define the curvature of the several screens.

The lower curved display screen 502 therefore transitions to player tracking area on VBD 506 via an interface 509, the VBD 506 may include a floating bash button 507 for use in the gaming cabinet 500 lighting effects, such as for peripheral lighting elements. Gaming cabinet 500 further includes a candle 504 integrated with the gaming cabinet 500, which may further include a upper or upper edge lighting feature 508 and/or a lateral or side edge lighting feature 510. In some examples, one or more lighting effects are visible, such as a side lighting feature 512.

Figure 5B:
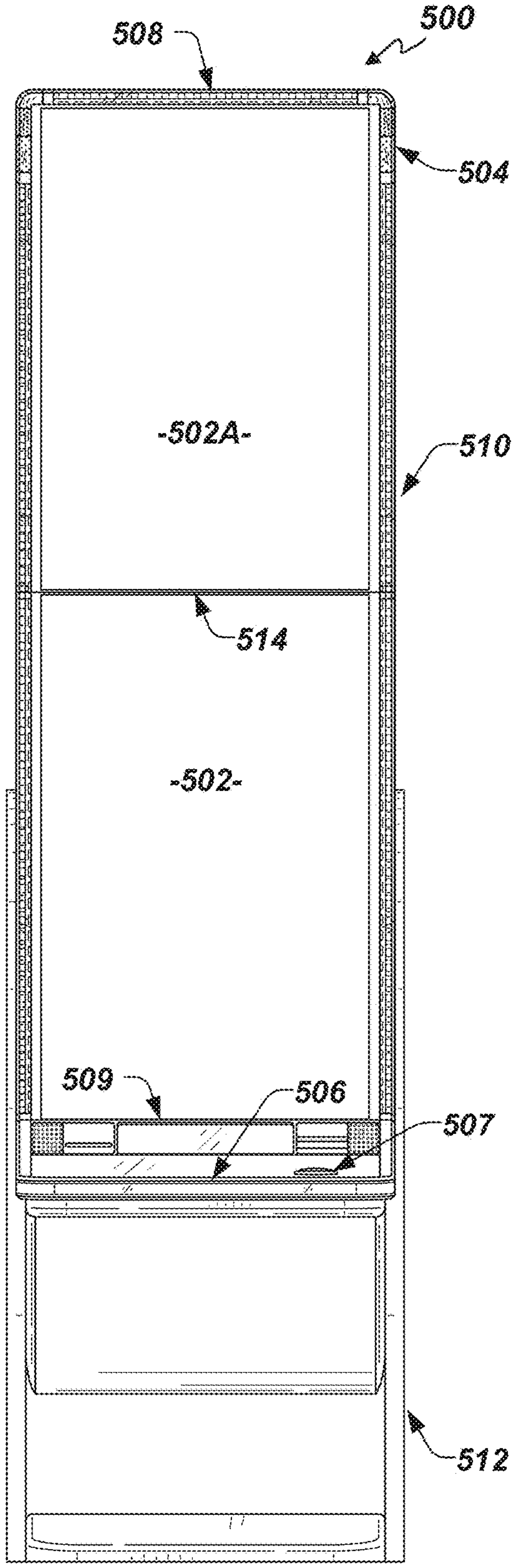
Figure 5C:
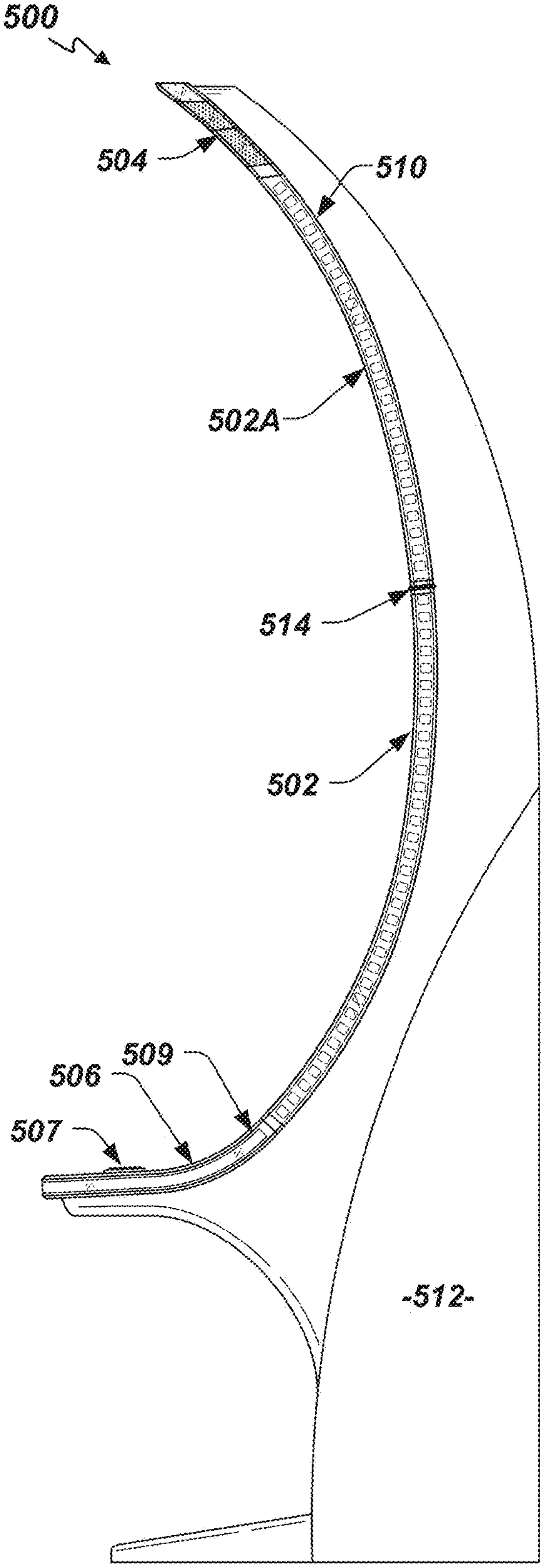

FIGS. 5B and 5C illustrate alternative views of gaming cabinet 500. As shown, FIG. 5B provides a front view of the gaming cabinet 500, whereas FIG. 5C provides a side view.

Figure 6:
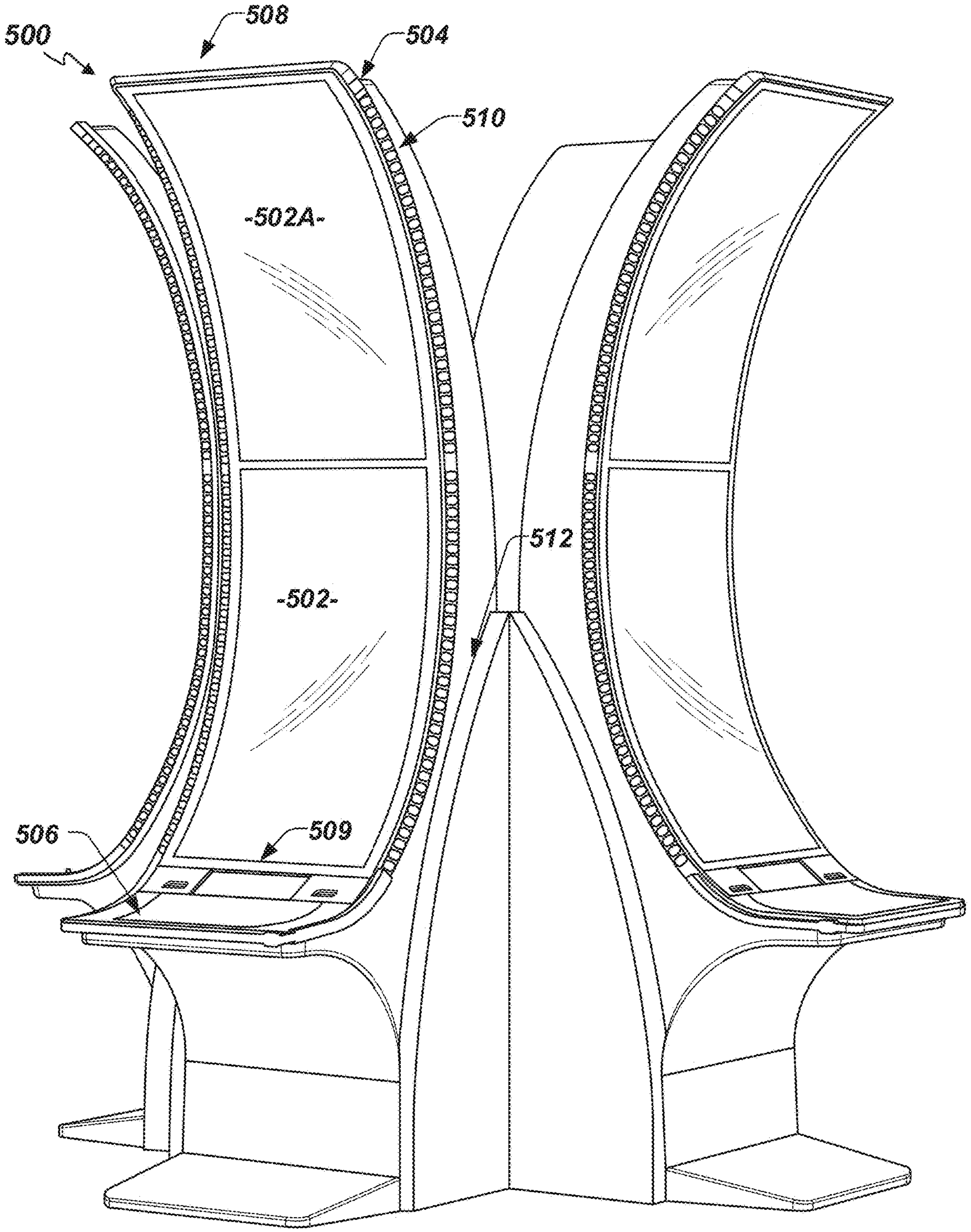
FIG. 6 illustrates an example block of four gaming cabinets, according to some aspects of the present disclosure.

FIG. 6 illustrates a bank or cluster of four gaming cabinets 500, each of which includes dual curved display screens 502, 502A (e.g., 49" 4K display) with a single VBD 506. As shown, each gaming cabinet 500 further includes one or more candles 504 integrated with each gaming cabinet 500, which may further include a upper lighting feature 508 and/or a lateral or side edge lighting feature 510. Regardless of position of the viewer, at least a portion of the one or more candles 504 is visible from a 360 degree view surrounding the electronic gaming machine. In some examples, one or more lighting effects are visible, such as a side lighting feature 512. The adjacent curved display screens 502A may be controlled independently and/or to display content in coordination with one or more adjacent screens 502A and/or one or more display screens 502 and/or VBD 506. When display of content is coordinated, a variety of animations may be provided, and/or a larger image presented, to indicate an event during gameplay.

Figure 6A:
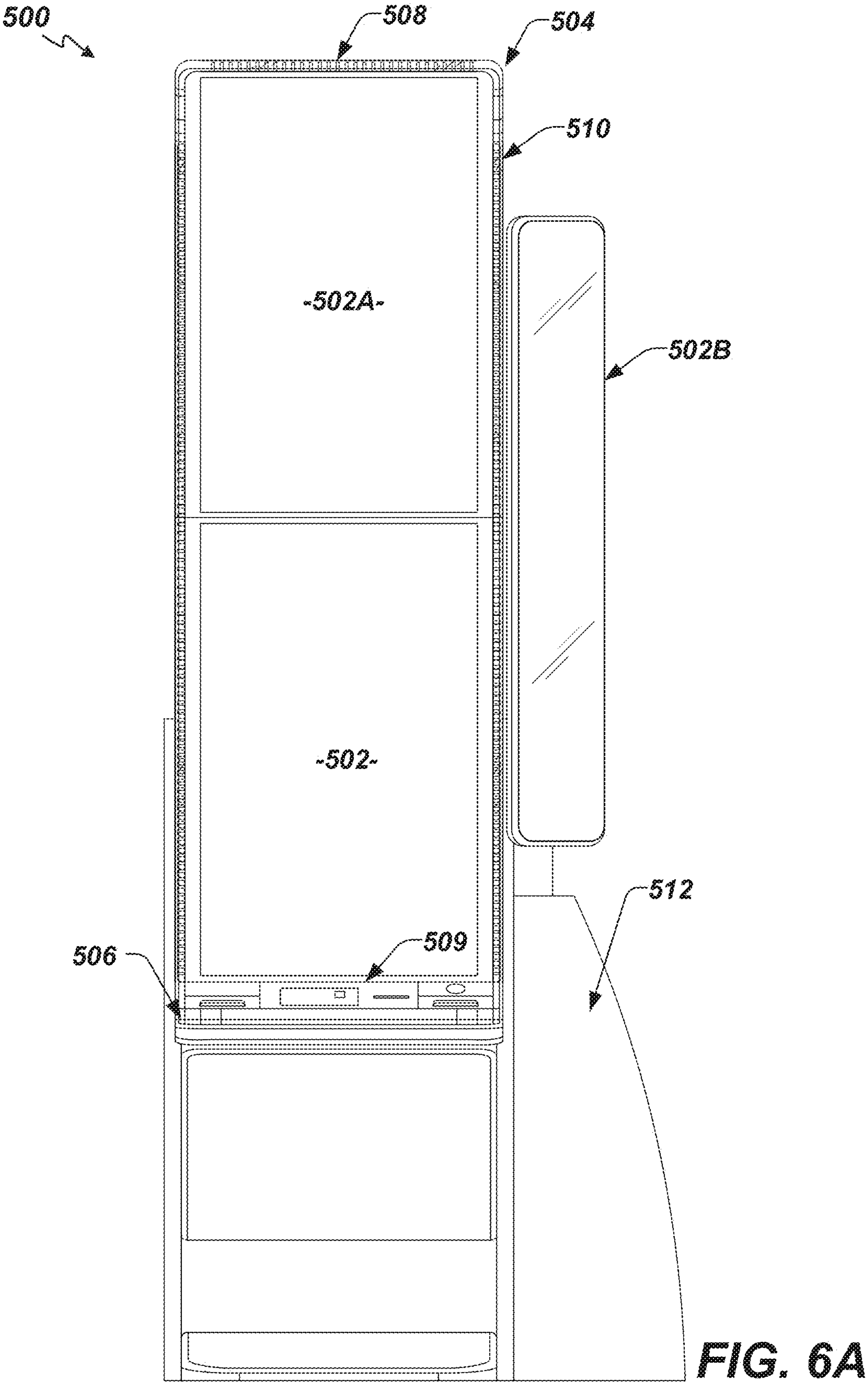
FIGS. 6A and 6B illustrate views of an example a gaming cabinet, according to some aspects of the present disclosure.
Figure 6B:
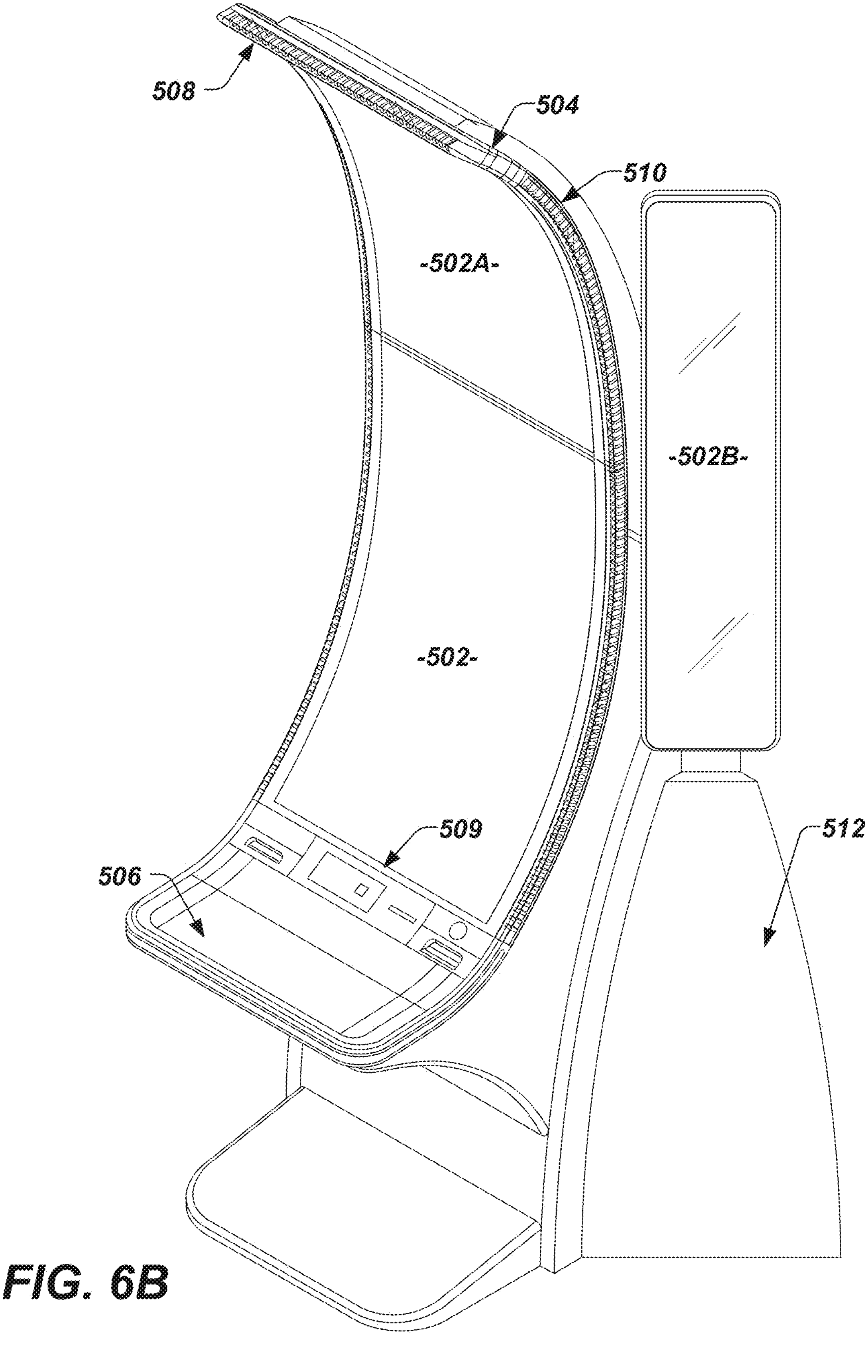

FIGS. 6A and 6B illustrate further alternative views of gaming cabinet 500. As shown, FIG. 6A provides a front view of the gaming cabinet 500, with an additional or alternative screen 502B arranged between adjacent gaming cabinets. As shown, the screen 502B may be angled relative to a viewing angle of an adjacent screen (e.g., screens 502, 502A) and/or the adjacent cabinet. FIG. 6B provides a side view of a gaming cabinet with screen 502B.

Figure 7:
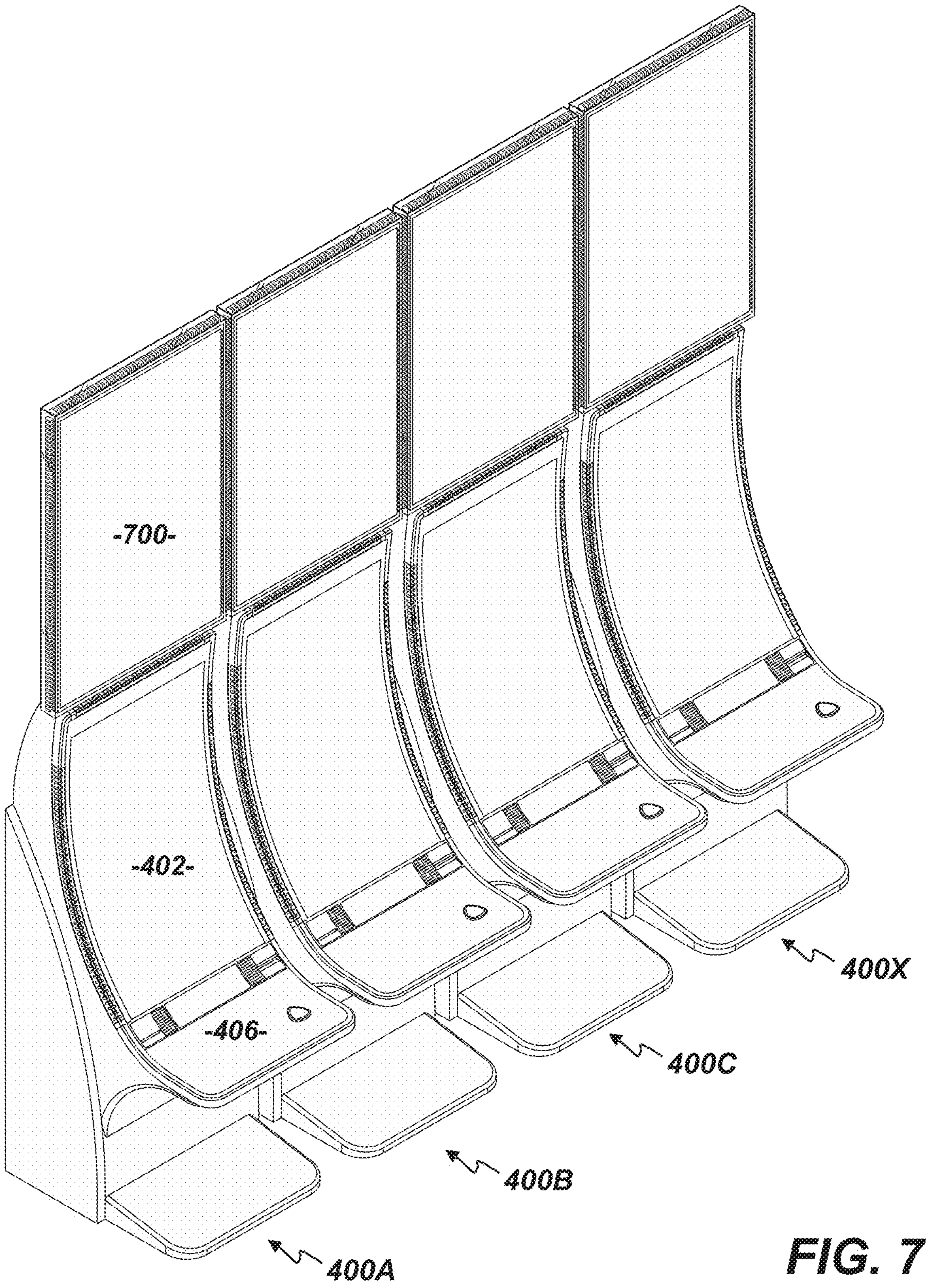
FIG. 7 illustrates another example block of four gaming cabinets of FIG. 4, according to some aspects of the present disclosure.

FIG. 7 illustrates a bank or cluster of four gaming cabinets 400A, 400B, 400C, 400X. As shown, a topper video display screen 700 is arranged above the main video display screen 402. In some examples, the topper video display screen 700 is a 65" display (e.g., a portrait topper). The topper video display screens 700 may be controlled independently and/or display of content may be coordinated with one or more adjacent screens and/or one or more display screens 402 or VBD 406. When display of content is coordinated, a variety of animations may be provided, and/or a larger image presented, to indicate an event during gameplay.

Figure 8A:
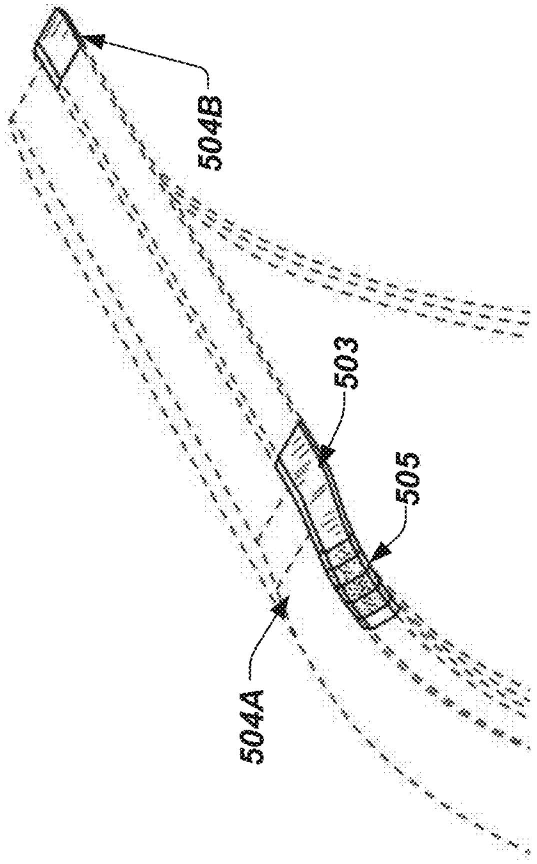
FIGS. 8 through 10A illustrate detailed views of candle and candle lighting variations of the example gaming machine of FIGS. 4-7 according to some aspects of the present disclosure.
Figure 8:
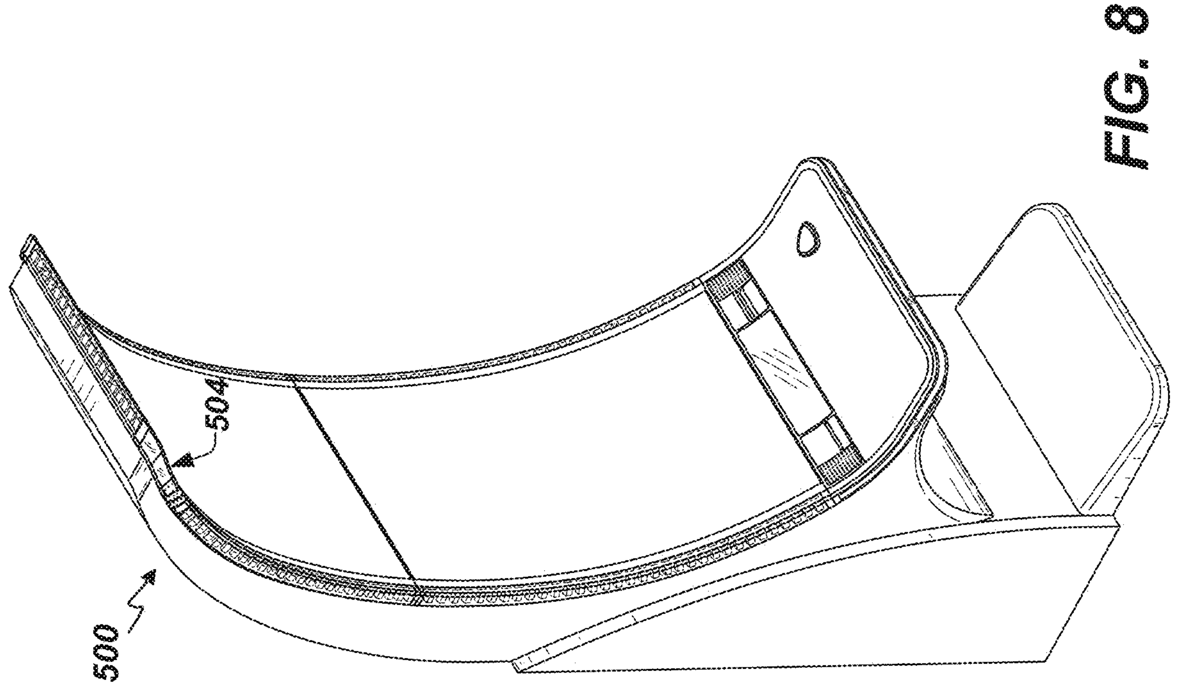

FIGS. 8 and 8A illustrates an example top of a gaming cabinet 500 including candle 504. Although illustrated with reference to gaming cabinet 500, the structure and/or principles disclosed with respect to FIG. 8 are applicable to gaming cabinet 400 and other contemplated gaming cabinet configurations.

FIG. 8A shows candles 504A and 504B, each with multiple features or stages. For example, stage 503 may be illustrated as a clear band, whereas stage 505 may represent a tiered band. Although two stages are illustrated in FIG. 8A with respect to candle 504A, a single stage and/or more than three may be provided. As shown, the candle 504A is at the upper end of the gaming cabinet 500 which, in conjunction with candle 504B, provides a 360 degree view to an observer; thus, on both sides of the gaming cabinet 500, and located at the top or upper end of the gaming cabinet 500. In some embodiments, the candle 504A is at the top of the gaming cabinet 500. For example, certain jurisdictions require candles to have two, three or four stages, which can be physical and/or visual divisions in the candle, such as to display different colors that signal a variety of events to an observer (e.g., a user or casino personnel).

The overall height of the candle section 504 shown in FIG. 8 may remain the same regardless of number of stages, although the candle 504 may be divided into multiple sections (e.g., two sections; three smaller sections; four smaller sections). The stages (e.g., stages 503, 505) may have different characteristics (e.g., different shades, colors, patterns, intensity, sizes, shapes, etc.) for each section. The characteristic need not be dedicated to a particular section as they may change with a particular design, structure, and/or per casino or jurisdictional requirements.

In some examples, the stages represent physical and/or visual divisions in the candle lighting. The different stages can be controlled to exhibit dynamic lighting effects or characteristics (e.g., changes in intensity, color, speed, selective illumination, pulsing, etc.), such as in response to trigger event corresponding to a specific event associated with the gameplay (e.g., a large wager, a jackpot award, etc.). One or more stages can be incorporated (e.g., two, three, four, or more). In some examples, an order, timing, or synchronization of the dynamic lighting effects are predetermined, whereas in other examples the rules governing the lighting effects are randomly selected (such as via a RNG call).

For example, the gaming machine (e.g., via UI system 302 and/or a game controller 202) can control the one or more stages of the candle 504 to activate a random number generator call in response to the trigger event, to select a sequence (e.g., one or more predetermined sequences) from a list of sequences based on one or more characteristics of the trigger event (e.g., corresponding to a jackpot award), and control the one or more stages to present one or more characteristics in accordance with the trigger event.

During a given sequence, the controller may control the one or more stages of candle 504A to present a first set of characteristics in accordance with a first sequence (e.g., a first predetermined sequence), and the one or more stages of candle 504B to present a second set of characteristics in accordance with a second sequence (e.g., a second predetermined sequence).

Figure 9A:
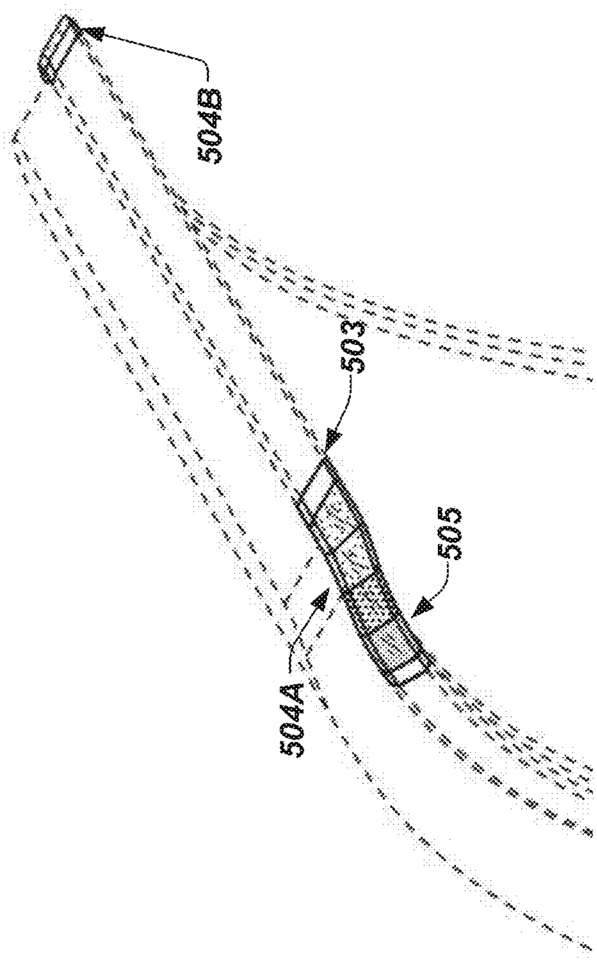
Figure 9:
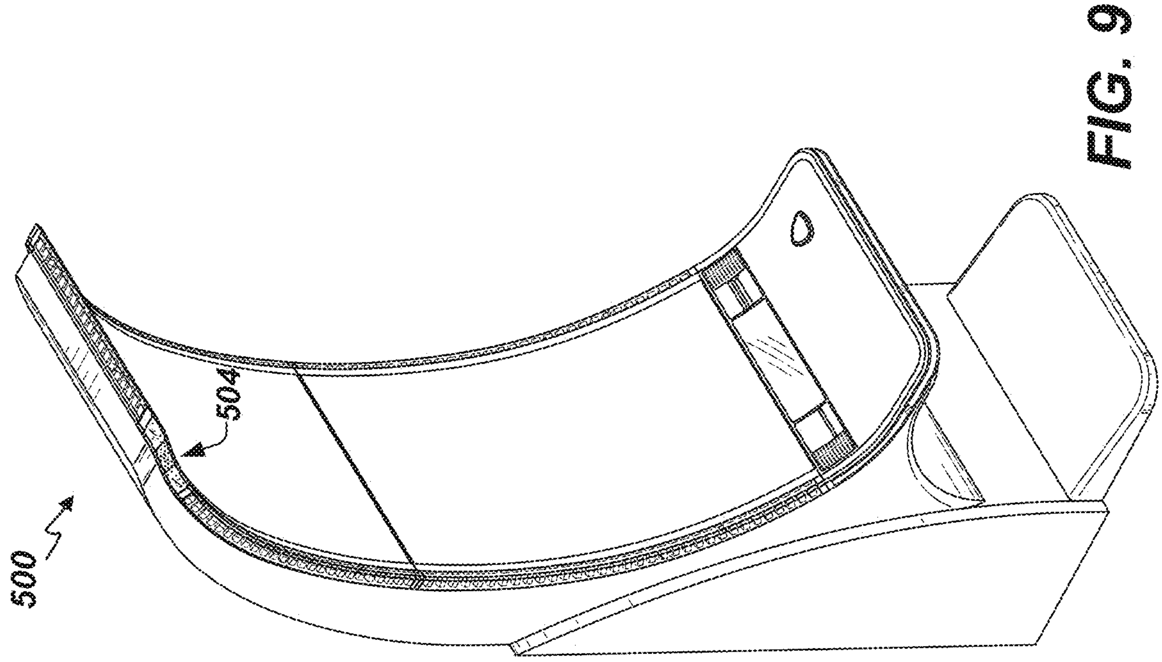
Figure 10A:
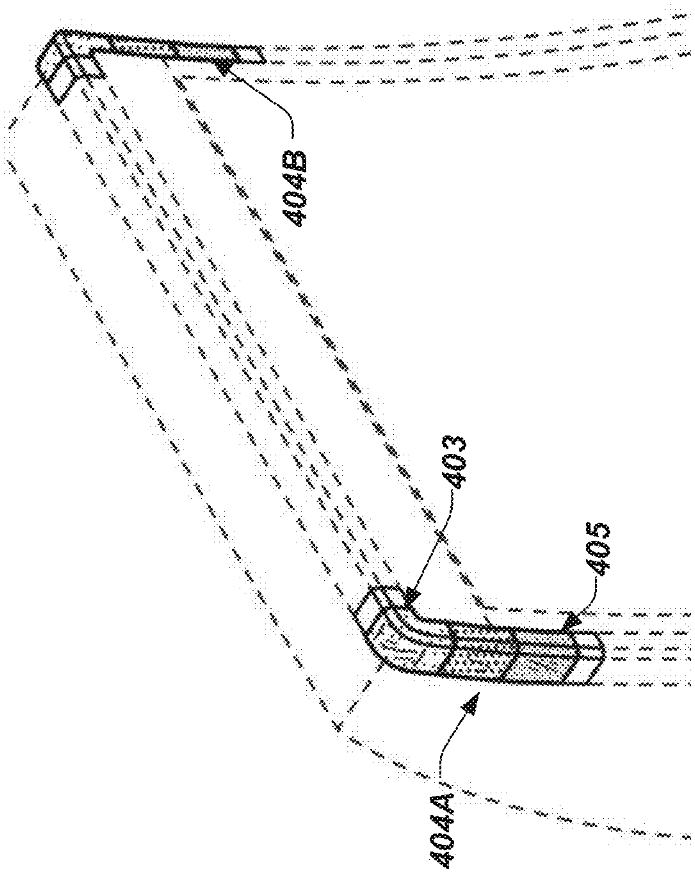
Figure 10:
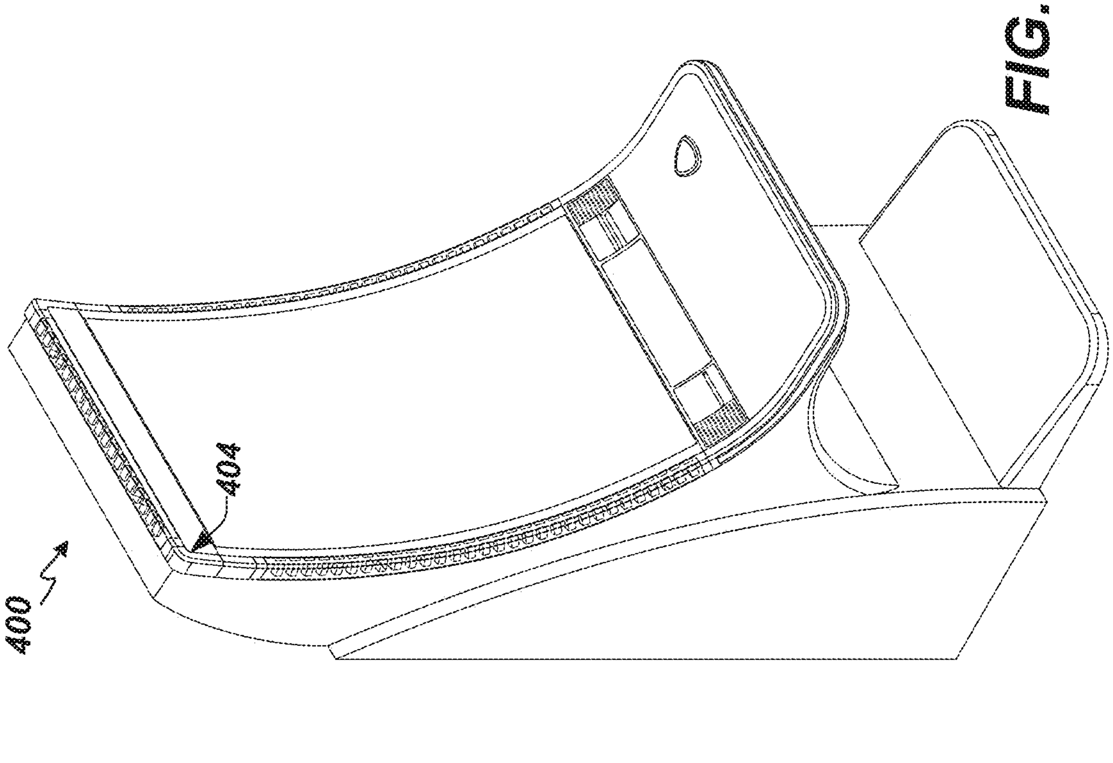

FIGS. 9-9A and FIGS. 10-10A illustrate example candle lighting variations. For example, FIG. 9A illustrates movement of stages 503 and 505 with respect to the top of the gaming cabinet 500. Similarly, FIG. 10A illustrates movement of stages 403 and 405 with respect to the top of the gaming cabinet 400.

In a disclosed example, candle lighting is integrated in a lighting system for an electronic gaming machine, such as for control and/or presentation. One objective of integrating the candle light is to maintain the functional purpose of the candle light (e.g., providing information, alerts, responding to elements of gameplay, etc.) without adding an additional element on top (e.g., a physical extension to house the candle light).

For example, provision of a physical extension (e.g., extending above the dimensions of the gaming cabinet) has the effect of adding additional height to a gaming cabinet. Placement of the candle light (e.g., candle lights 404, 504) within a lighting system of the gaming cabinet also provides unobstructed view of the candle light on taller cabinets (see, e.g., FIGS. 4-7). In contrast to typical candle lighting options, the disclosed integrated candle light provides an integrated lighting feature that reduces or eliminates the need for a discrete or separate lighting assembly or structure to be mounted on top of the gaming cabinet.

Figure 11:
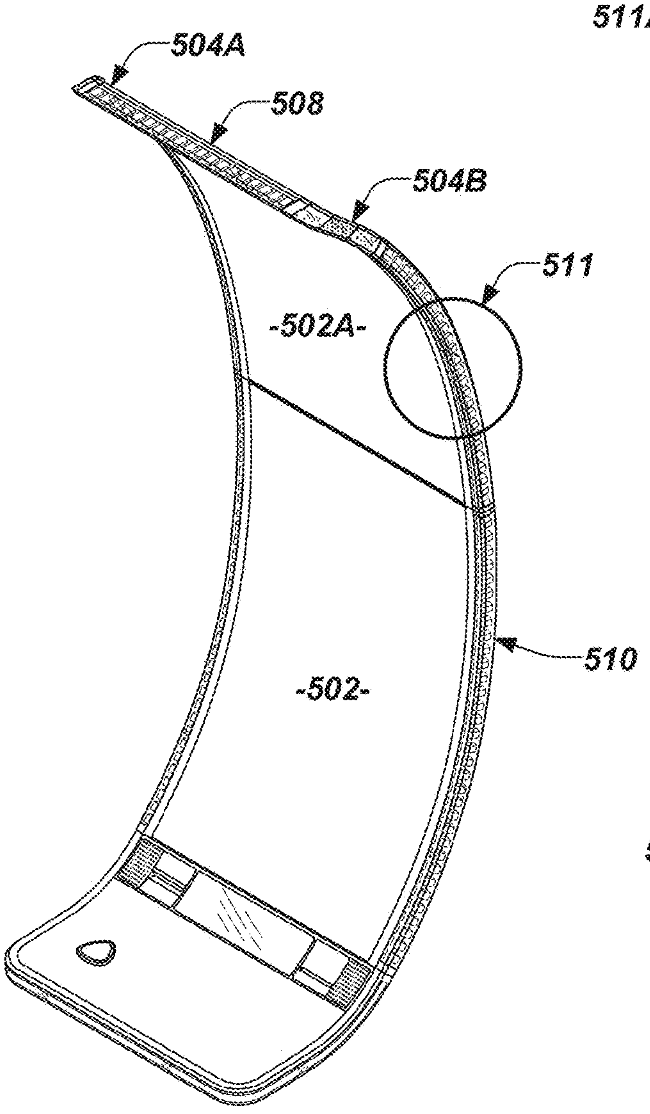
FIGS. 11 to 12B illustrate example lighting features employing diffuse elements to illuminate portions of the example gaming machine of FIGS. 4-10A according to some aspects of the present disclosure.

FIGS. 11 to 13B illustrate examples of edge lighting assemblies (e.g., corresponding to lighting features 410, 510) employing diffuse elements 513 and/or 515 to illuminate portions of the gaming cabinet 500 disclosed with respect to FIGS. 1-10A. In FIG. 11, lighting feature 510 is arranged around edges of curved display screens 502, 502A, such as incorporated within a trim. As shown the edges and/or trim may additionally or alternatively incorporate candles 504A, 504B, as well as upper lighting feature 508. Each diffuse element may be formed of a translucent or semi-translucent material configured to provide a desired lighting effect, such as diffusing, directing, flattening, or otherwise altering the presentation of light from the diffuse elements (e.g., from a light source within the gaming cabinet 500). Although illustrated with respect to gaming cabinet 500, the edge lighting assemblies disclosed in FIGS. 11 to 13B are applicable to gaming cabinet 400 or other considered gaming cabinets.

Figure 12A:
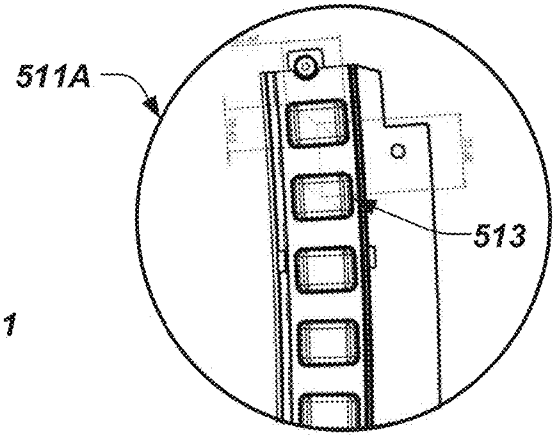
Figure 12B:
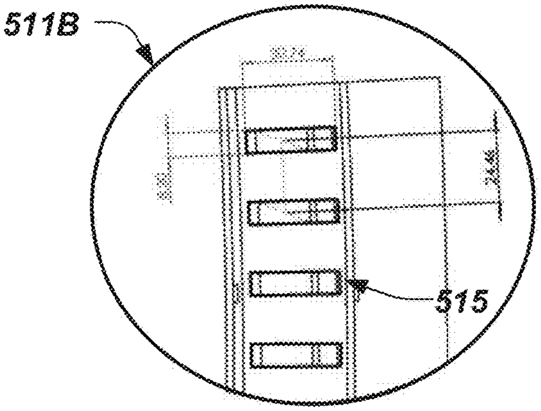

As shown, window 511 provides a detail of a portion of lighting effect 510 to show contours and/or shape of diffuse elements 513 and/or 515 within window 511, as shown in windows 511A and 511B of FIGS. 12A and 12B, respectively. In some disclosed examples, lighting effects 510 are created by employing three-dimensional lighting diffusers, e.g., diffuse element 513 and/or 515. Such diffusers may be arranged along the edges of a display screen, play surface, and/or the gaming cabinet, such as light piping. The use of three-dimensional diffusers 513 and/or 515 creates lighting effects with depth, emitting light from multiple surfaces. For example, diffuse elements 513 have a wide rectangular shape, with one or more bevels to allow lighting effects to change based on the observer's perspective. Diffuse elements 515 have a more narrow rectangular shape, and may or may not have the same or similar beveled surfaces.

In some examples, the lighting effects can include dynamic lighting (e.g., changes in intensity, color, speed, selective illumination, etc.). One or more such effects may be activated in response to gameplay, such as a large wager and/or award of a significant payout. In some examples, an order, timing, or synchronization of the dynamic lighting effects are predetermined, whereas in other examples the rules governing the lighting effects are randomly selected (such as via a RNG call). For example, the gaming machine (e.g., via UI system 302 and/or a game controller 202) can control the one or more stages of the diffuse element 513 and/or 515 to activate a random number generator call in response to the trigger event, to select a sequence (e.g., one or more predetermined sequences of lighting effects) from a list of sequences based on one or more characteristics of the trigger event (e.g., corresponding to a jackpot award), and control diffuse element 513 and/or 515 to present one or more characteristics in accordance with the trigger event. Such lighting effects may pique the interest of players, observes, and crowds as they move relative to and/or interact with the gaming cabinet. Thus, the disclosed lighting system provides a more immersive experience for the player and observer.

Figure 13A:
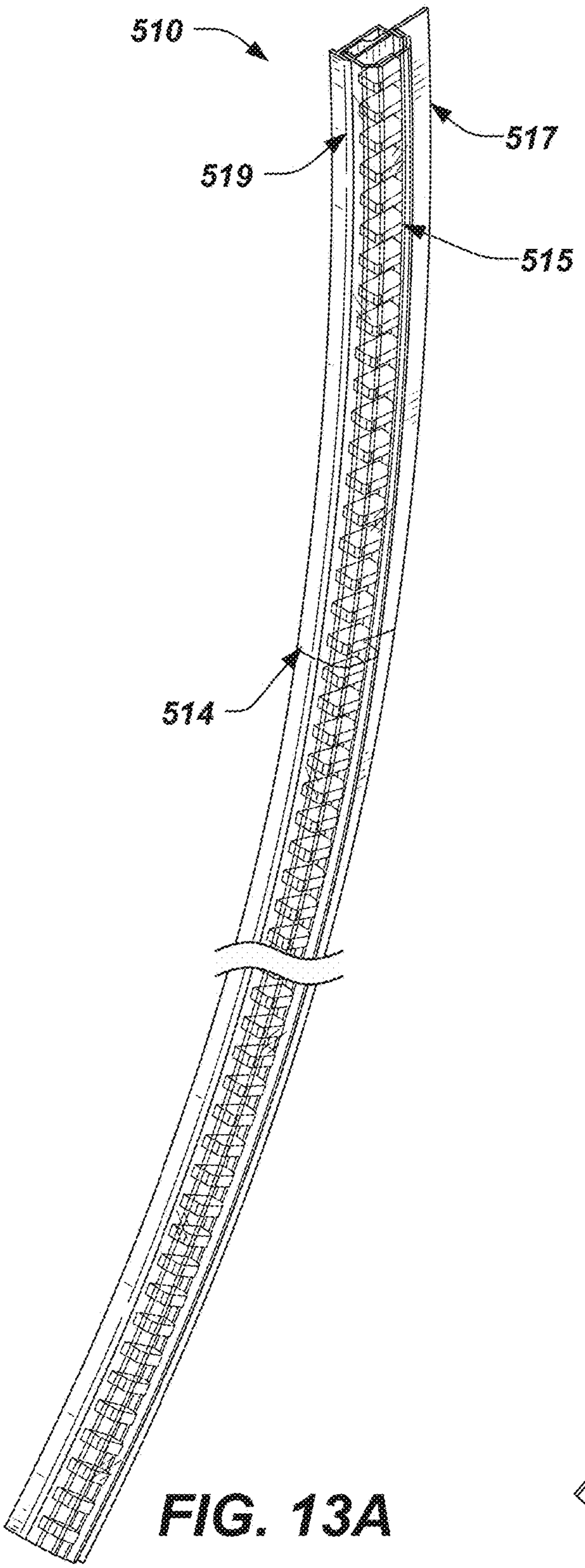
FIGS. 13A and 13B illustrate example views of the lighting features employing diffuse elements according to some aspects of the present disclosure.
Figure 13B:
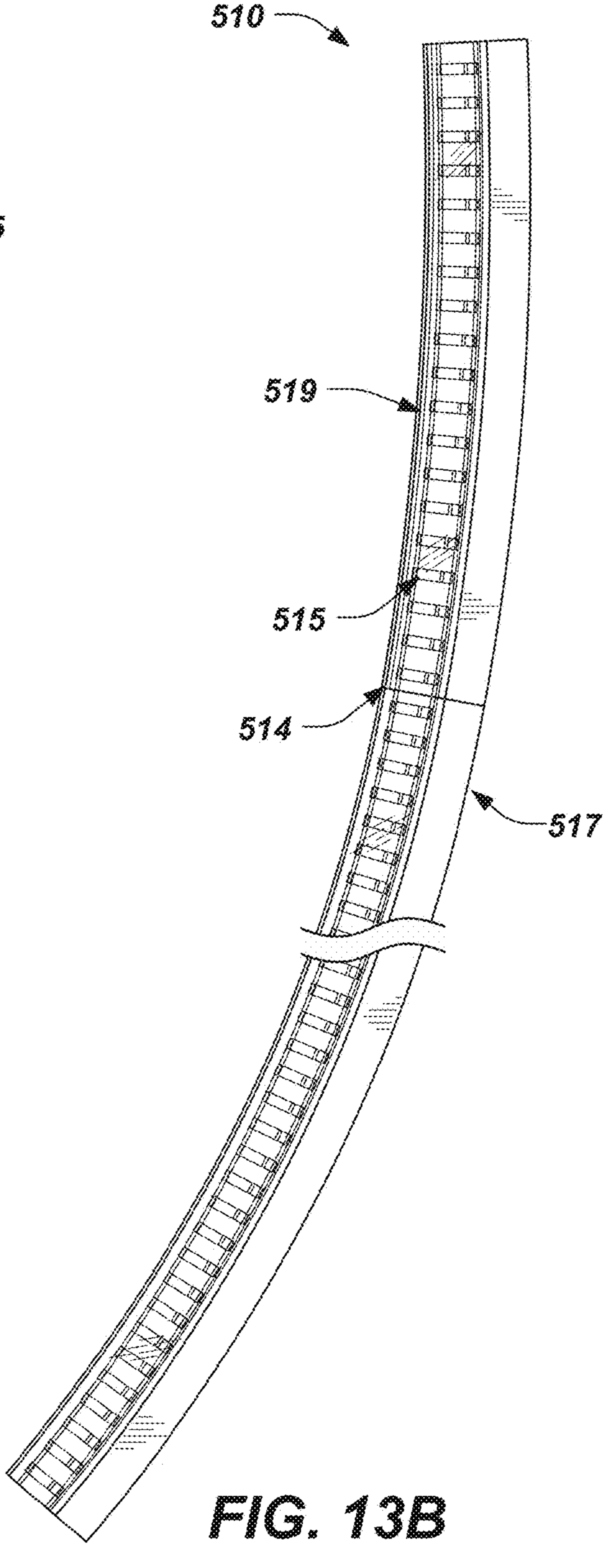

FIGS. 13A and 13B provide detailed views of the lighting effects 510. For example, diffuse elements 515 may be incorporated within a trim casing 519, which may provide structure and/or a protective cover for the diffuse elements 515. For example, one or more supports 519 may provide a mount for the diffuse elements 515 and/or a fixture to mount the trim 519 to the gaming cabinet 500. The protective cover may be semi-translucent to allow the full effect of the dynamic lighting effect from the diffuse element 515 to be displayed, and/or may include one or more characteristics (e.g., coloring, shading, etc.) to enhance the presentation of the lighting effect. Further, the trim 519 is arranged along one or more sides of a curved display screens, such that the trim follow a radius of curvature of an associated first spline function corresponding to the curved display screen.

In some examples, edge lighting is incorporated in an EGM that is designed to include such edge lighting and/or candle lighting embedded within the edge lighting. For design built EGMs, an EGM platform driver and/or circuit (e.g., as an integrated part of one or more EGM game controllers) may directly or indirectly connect to the edge lighting and/or candle lighting to operate both edge and candle lighting. In some examples, legacy EGMs (which may not be design built for edge and/or edge candle lighting) may be reconfigured to incorporate edge and/or edge candle lighting. Such retrofitted EGMs may employ an interface and/or circuit to drive the lighting features, and/or connect the lighting to one or more game controllers.

Figure 14:
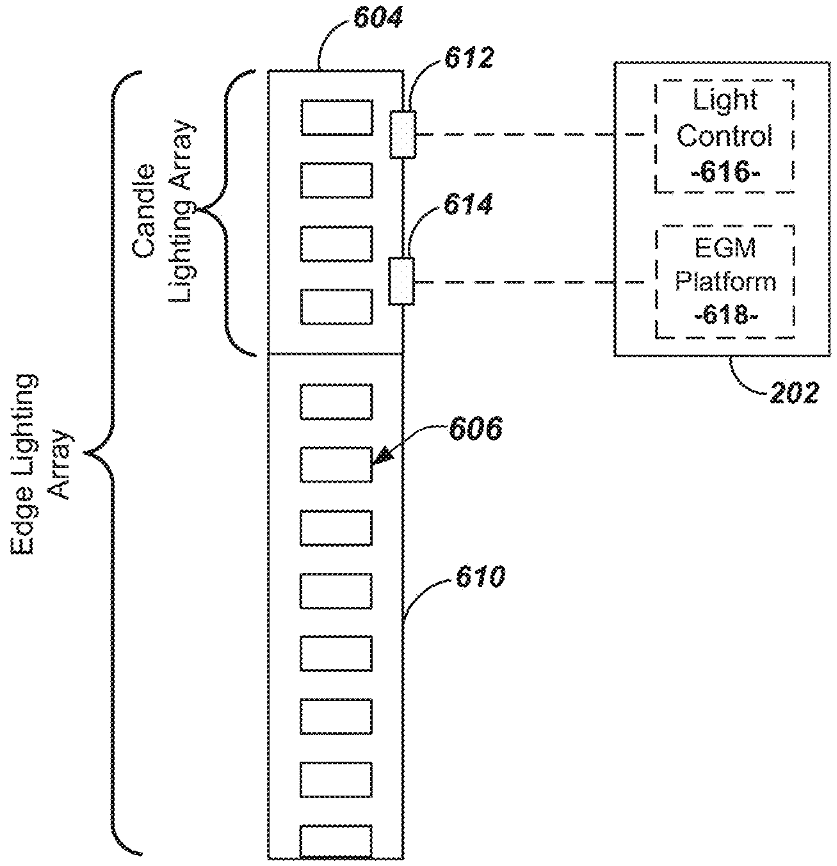
FIG. 14 illustrates example interfaces for connecting lighting features to an EGM according to some aspects of the present disclosure.

FIG. 14 illustrates two separate connections and/or interfaces for a candle or candle lighting array 604 (e.g., similar to candles 404 and 504) for connecting to an EGM, a gaming device, and/or a game controller. In some examples, the candle lighting array 604 is an extension to (e.g., a separate and/or distinct strip) or a designated section within an edge lighting array 610 (e.g., similar to lateral edge lighting feature 410 or edge lighting effects 510). For example, a legacy interface 612 connects the candle lighting array 604 to a light control board 616, which may be a part of a controller of a legacy EGM that did not originally include edge lighting features, yet may include game controller 202. In some examples where the EGM is designed to incorporate a candle lighting array 604 within the edge lighting array 610, a platform driven interface 614 may connect the candle lighting array 604 to an EGM platform driver and/or circuit 618 that was designed to incorporate and/or operate an edge lighting feature (and additionally or alternatively be included and/or controlled by game controller 202).

As shown in the example of FIG. 14, both legacy and platform interfaces are connected to the game controller 202 in a processor or control board. During installation of the candle lighting array 604, such as in the gaming environment, a technician plugs a cable to a corresponding interface depending on the type of EGM (e.g., a legacy EGM or an EGM that includes dedicated software and/or hardware to control operation of the candle lighting array 604). The game controller 202 may employ software, hardware, and/or firmware configured to identify a type of candle and/or which interface is being used to connect the candle lighting array 604 and control operation accordingly. For instance, if the game controller 202 identifies the added candle lighting array 604 is connected via the legacy interface 612, the game controller 202 may operate the array 604 as a candle only. If the game controller 202 recognizes that the added candle lighting array 604 is connected via the platform interface 614, the game controller 202 may operate the array 604 as part of the embedded edge lighting array (when a candle operation is not needed) and as a candle (when game play triggers a dedicated candle response). In some examples, the game controller 202 can be modified to control the candle lighting array 604 to operate in a particular mode regardless of the particular interface connection or type of EGM.

In some examples, an EGM may include a cabinet with a candle that may or may not be incorporated in an edge lighting feature, but the candle is limited to operation as a candle feature, such as due to jurisdictional requirements and/or a dedicated hardware in a legacy system (e.g., lack of platform drivers). In some jurisdictions, candles integrated into an edge array may not be allowed.

Although illustrated as a candle lighting array 604 at a top portion of the edge lighting array 610, any section and/or number of individual lights along the edge lighting array 610 may be used as a candle, and/or to display another feature. Thus, rather than requiring a separate, dedicated candle light component (e.g., extending from the top of an EGM) driven by an independent candle light board, such as light control 616, a section of the edge lighting array 610 is partitioned and/or extended to include one or more lights driven by a candle light EGM platform driver or circuit 618. The candle lighting array 604 may be presented with multiple features or stages (see, e.g., FIGS. 8A, 9A and 10A). For example, the features or stages may be illustrated as a clear band or a tiered band, created by a physical cover, film, or other translucent or semi-translucent material. For example, certain jurisdictions require candles to have two, three or four stages, which can be physical and/or visual divisions in the candle, such as to display different colors that signal a variety of events to an observer (e.g., a user or casino personnel). As shown in FIG. 14, the candle lighting array 604 may include one or more light emitting diodes (LEDs) to illuminate one or more translucent, colored coverings. In some examples, the LEDs are configured to generate one or more different colors (e.g., red, blue, green, white, purple, yellow etc.), in addition to or in the alternative of illuminating a colored covering. These and other control schemes may operate from a common LED driver (e.g., within the game controller 202) or from dedicated LED drivers (e.g., light control board 616 or EGM platform 618). In some examples, the different features or stages can be controlled to exhibit dynamic lighting effects or characteristics (e.g., changes in intensity, color, speed, selective illumination, pulsing, etc.), such as in response to trigger event corresponding to a specific event associated with the gameplay (e.g., a large wager, a jackpot award, etc.).

In some examples, rather than including a distinct candle light array integrated with the edge lighting array, the game controller 202 may select and drive one or more lights 606 of the array to perform candle functions. In such an embodiment, the candle light array would not need to include dedicated connections or interfaces. However, for a pure software-based solution, changes, updates, and/or corrections would require regulatory approval prior to implementation in the gaming environment. Such a pure software-based solution may control the edge lighting array 610 with or without a purpose driven interface (e.g., interface 612 and/or interface 614). For example, the edge lighting array 610 can connect to game controller 202, which can control one or more lights 606 to operate as an edge lighting display and/or a candle.

Figure 15:
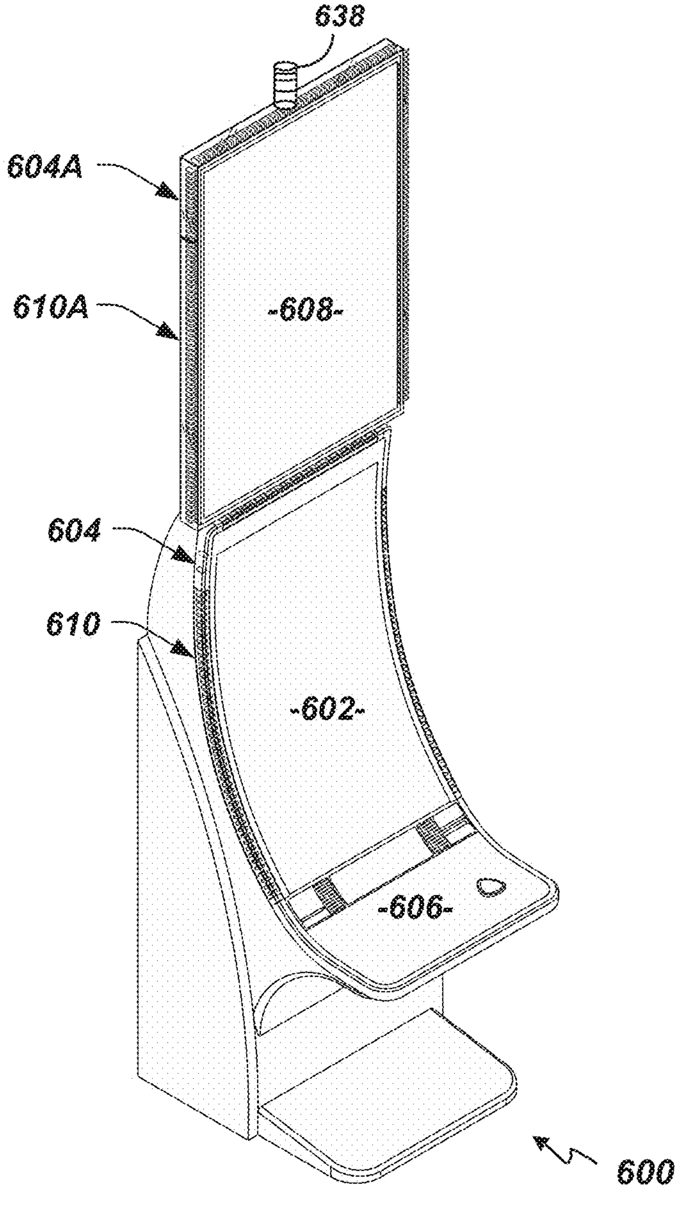
FIG. 15 illustrates an example gaming cabinet with a topper video display screen according to some aspects of the present disclosure.

FIG. 15 illustrates an example EGM 600 that includes a topper video display screen 608. As shown, the display 608 may include edge lighting features including an edge lighting array 610A, a candle lighting array 604A, and/or a candle extension 638.

In the example EGM 600, the candle lighting array 604A may be physically or functionally incorporated into the edge lighting array 610A and controlled by the game controller 202, light control board 616, and/or platform driven interface 614. The edge lighting array 610A, candle lighting array 604A, and/or candle extension 638 of the display 608 may operate in concert with the edge lighting array 610 and/or candle lighting array 604 of the EGM 600, including a section to operate as a candle. In some examples, the display 608 and/or one or more features may directly connect to the EGM game controller 202, and/or have a dedicated controller which may receive commands from the game controller, and/or operate independently. In some examples, a section of the additional display 608 may operate as a candle in addition to a candle section of the edge lighting array. As disclosed herein, such displays and/or the lighting features may have a unique identifier readable to the game controller 202, to identify placement, function, and/or lighting capability of the edge lighting features and/or candle extensions, as a list of non-limiting examples, which may be used to coordinate operation of edge lighting arrays.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming machine comprising:
a gaming cabinet;
a display mounted in or on the gaming cabinet;
a trim surrounding top and side edges of the display;
edge lighting integrated into the trim, the edge lighting extending around the top and side edges of the display, one or more candle lighting portions of the edge lighting being separately controllable from non-candle lighting portions of the edge lighting;
a game controller comprising an electronic gaming machine platform circuit configured to control the non-candle lighting portions of the edge lighting separately from the one or more candle lighting portions of the edge lighting, the game controller being configured to control at least one of the one or more candle lighting portions of the edge lighting to provide alerts to casino personnel, wherein a first candle of the one or more candle lighting portions has a first shape and a first size, a second candle of the one or more candle lighting portions has a second shape and a second size, and wherein the first shape is different from the second shape, the first size is different from the second size, or both; and
one or more interfaces configured to connect the edge lighting to the game controller.

2. The electronic gaming machine of claim 1, wherein the edge lighting wraps around the top and side edges of the display.

3. The electronic gaming machine of claim 2, wherein the one or more candle lighting portions are arranged at one or more upper corner locations of the display.

4. The electronic gaming machine of claim 1, wherein the one or more candle lighting portions are visible from a 360 degree view surrounding the electronic gaming machine.

5. The electronic gaming machine of claim 1, wherein the game controller is configured to implement one or more stages of candle lighting.

6. The electronic gaming machine of claim 5, wherein the one or more stages are operable to display one or more characteristics which change in response to elements of gameplay.

7. The electronic gaming machine of claim 5, wherein the one or more stages include a separate group of edge lights of the one or more candle lighting portions.

8. The electronic gaming machine of claim 5, wherein the one or more stages are operable to display a plurality of colors, each color of the plurality of colors signaling a different event to casino personnel.

9. The electronic gaming machine of claim 1, wherein the game controller controls the edge lighting in response to elements of gameplay.

10. The electronic gaming machine of claim 1, wherein the one or more candle lighting portions are integrated into the trim at one or more upper portions of the display and wrap around one or more corners of the display.

11. An electronic gaming machine comprising:
a gaming cabinet;
a display mounted in or on the gaming cabinet;
an edge lighting array arranged on one or more top and side edges of the display, one or more candle lighting portions of the edge lighting array being separately controllable from non-candle lighting portions of the edge lighting array;
and
a game controller comprising:
a light control board, and
an electronic gaming machine platform circuit configured to control the non-candle lighting portions of the edge lighting array separately from the one or more candle lighting portions of the edge lighting array, wherein the game controller is configured to implement one or more stages of candle lighting, wherein the one or more stages are operable to display a plurality of colors, each color of the plurality of colors signaling a different event to casino personnel.

12. The electronic gaming machine of claim 11, wherein the one or more candle lighting portions comprise a first candle lighting portion arranged on a first upper portion of the gaming cabinet and a second candle lighting portion arranged on a second upper portion of the gaming cabinet.

13. The electronic gaming machine of claim 12, wherein the one or more candle lighting portions are arranged at one or more upper corner locations of the display.

14. The electronic gaming machine of claim 11, wherein the edge lighting array wraps around the top and side edges of the display.

15. The electronic gaming machine of claim 11, further comprising one or more interfaces operable to connect the one or more candles to the light control board and to connect the edge lighting array to the electronic gaming machine platform circuit, wherein the light control board is operable to execute instructions which cause the light control board to control a plurality of stages of the one or more candle lighting portions to present one or more characteristics in accordance with a plurality of sequences upon occurrence of a trigger event.

16. The electronic gaming machine of claim 15, wherein the light control board is further operable to execute instructions which cause the light control board to:
control a plurality of stages of a first candle lighting portion of the one or more candle lighting portions to present the one or more characteristics in accordance with a first sequence of the plurality of sequences; and
control a plurality of stages of a second candle lighting portion of the one or more candle lighting portions to present the one or more characteristics in accordance with a second sequence of the plurality of sequences.

17. An electronic gaming machine comprising:
a gaming cabinet;
a display mounted in or on the gaming cabinet;
an edge lighting array arranged on top and side edges of the display, the edge lighting array including one or more candle lighting arrays integrated into the edge lighting array at the top edge of the display;
a game controller comprising an electronic gaming machine platform circuit; and
one or more interfaces operable to connect the edge lighting array to the electronic gaming machine platform circuit, wherein the electronic gaming machine platform circuit is operable to execute instructions which cause the electronic gaming machine platform circuit to at least control the one or more candle lighting arrays to present one or more characteristics in accordance with a sequence upon occurrence of a trigger event, wherein the game controller is configured to implement two or more stages of candle lighting, each stage of the two or more stages signaling a different event to casino personnel, a first stage of the two or more stages having a first characteristic that is different from a second characteristic of a second stage of the two or more stages.

18. The electronic gaming machine of claim 17, further comprising top trim and side trim to support the edge lighting array, wherein the one or more candle lighting arrays are arranged within the edge lighting array along a portion of the top trim.

19. The electronic gaming machine of claim 17, wherein the one or more candle lighting arrays are integrated into the edge lighting array at one or more upper corners of the display and wrap around the one or more corners of the display.

20. The electronic gaming machine of claim 17, wherein the first characteristic is a shade, a color, a pattern, an intensity, a size or a shape.

* * * * *